(12) United States Patent
Peschel et al.

(10) Patent No.: US 10,626,940 B2
(45) Date of Patent: Apr. 21, 2020

(54) DISC BRAKE HAVING A SYNCHRONIZATION UNIT

(71) Applicant: KNORR-BREMSE Systeme fuer Nutzfahrzeuge GmbH, Munich (DE)

(72) Inventors: Michael Peschel, Schoengeising (DE); Alexander Asen, Eichendorf (DE); Christian Stoeger, Osterhofen (DE); Christian Brandl, Plattling (DE); Matthias Klingner, Moorenweis (DE); Abdelaziz Rguichi, Olching (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 15/907,041

(22) Filed: Feb. 27, 2018

(65) Prior Publication Data

US 2018/0187733 A1 Jul. 5, 2018

Related U.S. Application Data

(63) Continuation of application No. PCT/EP2016/069207, filed on Aug. 12, 2016.

(30) Foreign Application Priority Data

Aug. 31, 2015 (DE) .................. 10 2015 114 440

(51) Int. Cl.
*F16D 65/56* (2006.01)
*F16D 55/00* (2006.01)
*F16D 121/02* (2012.01)

(52) U.S. Cl.
CPC .... *F16D 65/568* (2013.01); *F16D 2055/0016* (2013.01); *F16D 2121/02* (2013.01); *F16D 2250/0084* (2013.01)

(58) Field of Classification Search
CPC ...... F16D 65/56; F16D 65/567; F16D 65/568; F16D 2055/0016; F16D 2055/002; F16D 2250/0084
See application file for complete search history.

(56) References Cited

U.S. PATENT DOCUMENTS 5,353,896 A 10/1994 Baumgartner et al.
5,568,845 A * 10/1996 Baumgartner ........ F16D 55/227
188/196 D (Continued)

FOREIGN PATENT DOCUMENTS

CN 1326057 A 12/2001
CN 1326059 A 12/2001
(Continued)

OTHER PUBLICATIONS

EPO machine translation for EP 2636917 A1, Sep. 2013. (Year: 2013).*

(Continued)

*Primary Examiner* — Thomas J Willams
(74) *Attorney, Agent, or Firm* — Crowell & Moring LLP

(57) ABSTRACT

A disc brake, preferably actuated by compressed air, for a motor vehicle, has a brake caliper which has a brake application section with a brake application device with a rotary brake lever, at least one wear adjusting device for adjusting wear of brake pads, and a brake disc with a synchronization unit which includes an adjusting device, a drive device and a synchronizer. The adjusting device and the drive unit are inserted in each case into a threaded plunger of a spindle unit and are attached by way of a mounting arrangement on a bearing wall of the brake application section of the brake caliper. The synchronization unit is installed with the adjusting device and the drive device as a preassembled group into the brake application section of the brake caliper, wherein the synchronizer is (Continued)

arranged in the region of the mounting arrangements on the bearing wall within the brake application section. A method for installing a synchronization unit is provided.

9 Claims, 17 Drawing Sheets

(56) References Cited

U.S. PATENT DOCUMENTS

| | | | |
|---|---|---|---|
| 5,927,445 | A | 7/1999 | Bieker et al. |
| 7,926,626 | B2 | 4/2011 | Iraschko |
| 8,636,118 | B2 * | 1/2014 | Iraschko ............... F16D 65/567 188/196 V |
| 9,334,912 | B2 | 5/2016 | Weber et al. |
| 2002/0017436 | A1 | 2/2002 | Ortegren et al. |
| 2002/0023807 | A1 | 2/2002 | Ortegren et al. |
| 2004/0026181 | A1 | 2/2004 | Baumgartner et al. |
| 2004/0238292 | A1 | 12/2004 | Ortegren et al. |
| 2010/0230219 | A1 | 9/2010 | Helf |
| 2013/0008749 | A1 | 1/2013 | Sandberg et al. |
| 2014/0262632 | A1 * | 9/2014 | Weber ................... F16D 65/183 188/71.9 |

FOREIGN PATENT DOCUMENTS

| | | |
|---|---|---|
| CN | 101802436 A | 8/2010 |
| CN | 103154557 A | 6/2013 |
| CN | 104271979 A | 1/2015 |
| DE | 40 34 165 A1 | 12/1991 |
| DE | 42 12 353 A1 | 10/1993 |
| DE | 10 2004 037 771 A1 | 3/2006 |
| DE | 10 2011 119 768 A1 | 6/2013 |
| DE | 10 2012 013 966 A1 | 1/2014 |
| EP | 1 160 476 A2 | 12/2001 |
| EP | 1 160 477 A2 | 12/2001 |
| EP | 1 160 478 A2 | 12/2001 |
| EP | 1 160 479 A2 | 12/2001 |
| EP | 1 160 480 A2 | 12/2001 |
| EP | 2 307 753 B1 | 2/2012 |
| EP | 2 546 541 A1 | 1/2013 |
| EP | 2636917 A1 * | 9/2013 ............. F16D 65/56 |
| EP | 2 685 124 B1 | 9/2016 |
| EP | 2 895 762 B1 | 5/2018 |
| RU | 2 298 712 C2 | 5/2007 |
| WO | WO 96/34216 A1 | 10/1996 |
| WO | WO 97/22814 A1 | 6/1997 |
| WO | WO 02114127 A2 | 2/2002 |
| WO | WO 03/023244 A1 | 3/2003 |
| WO | WO 2005/073586 A1 | 8/2005 |
| WO | WO-2013079376 A2 * | 6/2013 ........... F16D 65/183 |
| WO | WO 2014/041161 A1 | 3/2014 |
| WO | WO 2016/046066 A1 | 3/2016 |

OTHER PUBLICATIONS

Chinese-language Office Action issued in counterpart Chinese Application No. 201680063603.3 dated May 17, 2019 with English translation (10 pages).

Russian Office Action issued in counterpart Russian Application No. 1810215 dated Dec. 28, 2018 with partial English translation (13 pages).

International Search Report (PCT/ISA/210) issued in PCT Application No. PCT/EP20161069207 dated Dec. 8, 2016 with English translation (11 pages).

German-language Written Opinion (PCT/ISA/237) issued in PCT Application No. PCT/EP2016/069207 dated Dec. 8, 2016 (six pages).

German-language Office Action issued in counterpart German Application No. 10 2015 114 440.9 dated Jun. 23, 2016 (six pages).

International Preliminary Report on Patentability (PCT/IB/326 & PCT/IB/373) issued in PCT Application No. PCT/EP2016/069207 dated Mar. 6, 2018, including English translation of document C2 (Japanese-language Written Opinion (PCT/ISA/237 previously filed on Feb. 27, 2018)) (nine (9) pages).

Hindi-language Office Action issued in Indian Application No. 201837007347 dated Feb. 17, 2020 with English translation (eight (8) pages).

* cited by examiner

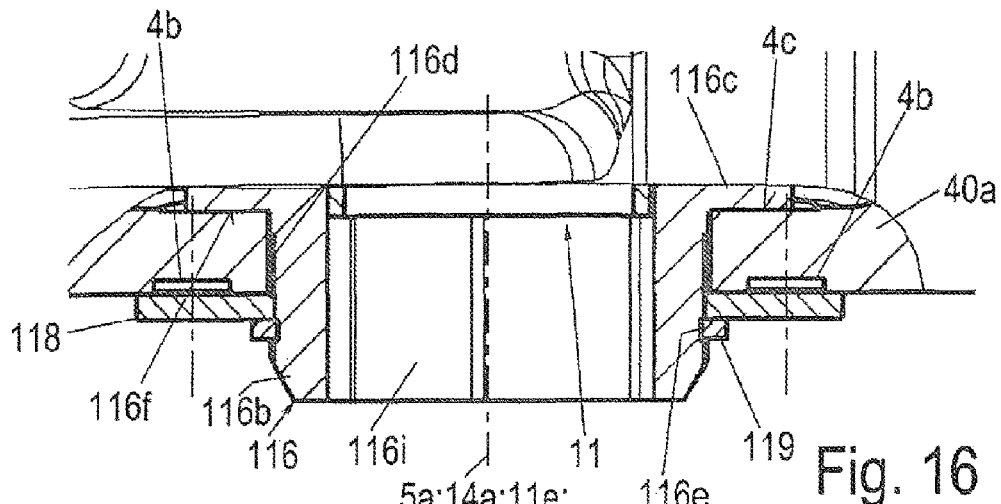
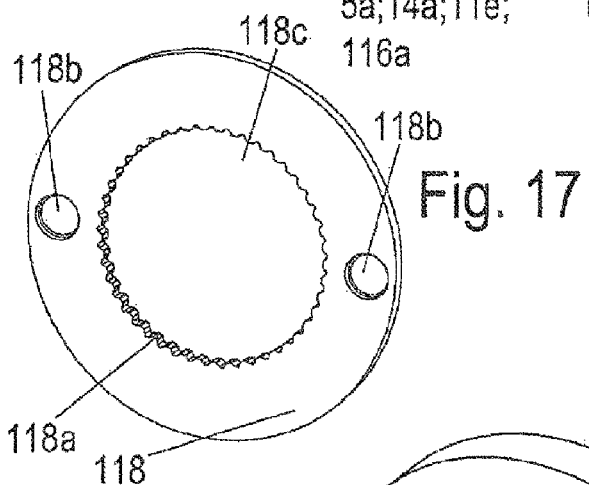
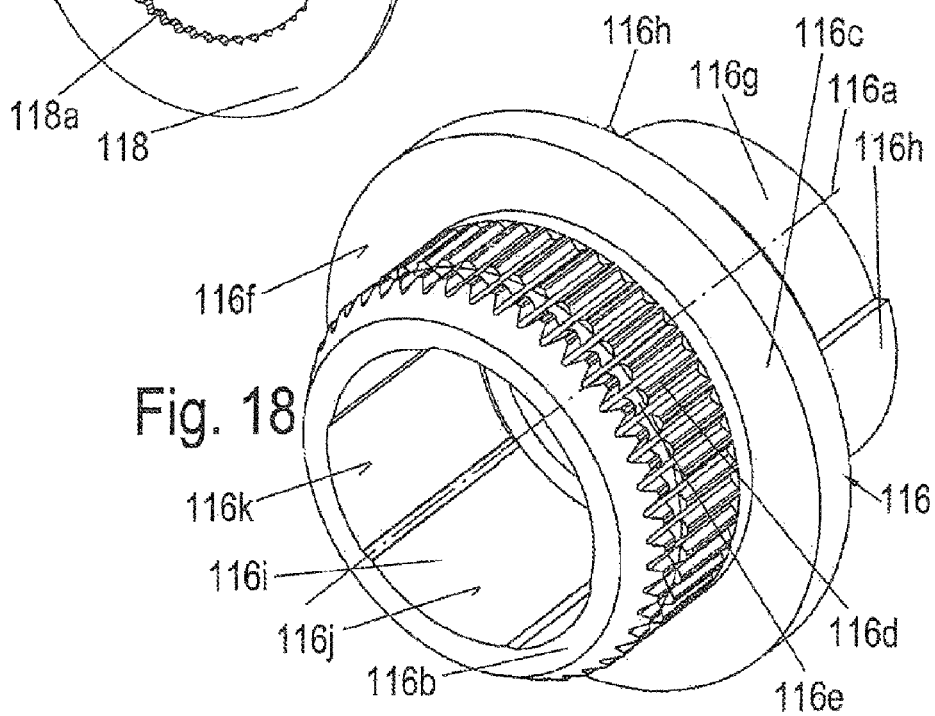

DISC BRAKE HAVING A SYNCHRONIZATION UNIT

CROSS REFERENCE TO RELATED APPLICATIONS

This application is a continuation of PCT International Application No. PCT/EP2016/069207, filed Aug. 12, 2016, which claims priority under 35 U.S.C. § 119 from German Patent Application No. 10 2015 114 440.9, filed Aug. 31, 2015, the entire disclosures of which are herein expressly incorporated by reference.

BACKGROUND AND SUMMARY OF THE INVENTION

The invention relates to a disc brake, in particular for a motor vehicle, having a synchronization unit. The invention also relates to a method for installing a wear-compensating readjustment apparatus into disc brakes of said type.

Disc brakes of said type are commonly used in vehicles and certain technical appliances. This is the case in particular in the passenger motor vehicle and commercial (utility) vehicle sector. In the case of the typical structural form of a disc brake, the latter is composed of a brake caliper together with an internal mechanism, of generally two brake pads and of the brake disc. By means of a preferably pneumatically actuated cylinder, the cylinder forces are introduced into the internal mechanism, which is also referred to as application apparatus, and said cylinder forces are boosted by means of an eccentric mechanism, for example a brake rotary lever, and transmitted as an application force via threaded spindles to the brake pads and the brake disc, wherein the wear of the brake disc and the brake pads is compensated by means of the threaded spindles.

The application forces act via both brake pads on the brake disc, the rotational movement of which is decelerated in a manner dependent on the magnitude of the application force. Said deceleration is significantly co-determined by the friction coefficient between the brake disc and brake pad. Since the pads are, in terms of construction, designed as wearing parts and the friction coefficients are dependent on the firmness, said pads are generally softer than the brake disc, that is to say the pads undergo a change in pad thickness over their usage duration; they wear. This change in pad thickness gives rise to the need for a wear-compensating readjustment mechanism to compensate the change and thus set a constant air gap. A constant air gap is required in order to keep the response times of the brake short, to ensure the free movement of the brake disc and to provide a stroke reserve for limit load situations.

An example of a wear-compensating readjustment apparatus is described in DE 10 2004 037 771 A1. Here, a drive rotational movement is transmitted for example from a torque-limiting device via a continuously acting clutch to an adjustment spindle of a pressure plunger. The air gap is in this case set continuously.

In the case of a disc brake with more than one threaded spindle, the drive rotational movement for the wear-compensating readjustment of one threaded spindle is transmitted synchronously to the other threaded spindle(s) by a synchronizer. A synchronizer of said type interacts with corresponding components of the threaded spindles, for example chain and sprockets. There are different proposed solutions for the positioning of the synchronizer, for example on a force-transmitting crossmember, behind the brake rotary lever or outside the brake caliper.

DE 40 34 165 A1 illustrates an example of a disc brake having a synchronizing device.

For the wear-compensating readjustment, it is necessary for a readjustment device to be positioned in the brake caliper. Here, the stop, which acts within the readjustment device, of the transmission mechanism of the readjustment device must remain active. As a result, the readjustment device is positioned, that is to say set, in terms of its angular position in the brake caliper in a manner adapted to the respective components.

In this regard, EP 2 307 753 B1 illustrates an example wherein, after the readjustment device has been correctly positioned, a ball is pressed into a pocket situated in the brake caliper laterally at the readjustment device receptacle. The pocket is positioned such that the ball covers a plate part (head plate) of the readjustment device and deforms said plate part during the pressing-in process. The readjustment device is thereby set and fixed in terms of its angular position in the brake caliper. For reasons relating to the system, the readjustment device can thus be fixed only in terms of its angular position but not in terms of its axial position. Small overlaps (ball diameter approximately 5 mm, of which 1.5 mm overlaps the readjustment device) are technically conceivable. It is considered to be disadvantageous that this fixing can loosen under certain adverse loads (for example intense vibrations in defined directions).

There is a constant demand for simplification and for an increase of the service life of disc brakes, with a simultaneous reduction of costs or at least without an additional increase in costs.

It is therefore the object of the present invention to provide an improved disc brake.

The object is achieved by a disc brake according to embodiments of the invention.

The object is also achieved by a method of installing a synchronizing unit in a brake caliper in accordance with embodiments of the invention.

A disc brake is provided which has a synchronization unit as a preassembled group, which is installed into the brake caliper from a pad slot side. Here, the synchronizer is arranged within the application section of the brake caliper in the region of the bearing arrangements on the bearing wall. This is advantageous because no additional mounting of the synchronizer and associated functional elements from the outside is necessary.

A disc brake according to the invention, preferably actuated by compressed air, in particular for a motor vehicle, comprises a brake caliper which has an application section with an application apparatus, preferably with a brake rotary lever, at least one wear-compensating readjustment apparatus for readjustment for compensating wear of brake pads, and a brake disc with a synchronization unit which comprises a readjustment device, a driver device and a synchronizer, wherein the readjustment device and the driver unit are preferably each inserted into a threaded plunger of a spindle unit and mounted by means of a bearing arrangement on a bearing wall of the application section of the brake caliper. The synchronization unit is installed, as a preassembled group together with the readjustment device and the driver device, into the application section of the brake caliper, wherein the synchronizer is arranged within the application section of the brake caliper in the region of the bearing arrangements on the bearing wall.

There is the further advantage that the synchronizer is arranged outside the application mechanism, that is to say neither on the crossmember nor between the latter and the brake rotary lever, but rather on the inner side of the bearing wall. It is thus possible for the brake rotary lever and the spindle units to be installed and also removed separately from the synchronization unit. This saves time during maintenance and repair work.

A method according to the invention for installing a synchronization unit having a readjustment device and a driver device into a brake caliper of a disc brake as described above has the following method steps:

(S1) Assembling the synchronization unit having the readjustment device and the driver device, wherein a synchronizer with synchronizing wheels is arranged on upper ends of the readjustment device and of the driver device; (S2) inserting the synchronization unit thus assembled into an interior space of an application section of the brake caliper through a brake-disc-side bottom plate flange; and (S3) mounting the readjustment device and the driver device of the synchronization unit thus inserted in a bearing wall of the application section of the brake caliper.

In one embodiment, the bearing arrangement of the readjustment device has a bore in the bearing wall of the application section of the brake caliper and a collar on the bearing wall within the application section of the brake caliper, a support disc on the readjustment device, and a bearing block with a holding section. Simple fixing of the readjustment device in the bearing wall is thus possible.

In a further embodiment, a bearing arrangement of the driver device has a bore in the bearing wall of the application section of the brake caliper and a collar on the bearing wall of the application section of the brake caliper, a support disc on the driver device, and the bearing block with a further holding section. Simple fixing of the driver device in the bearing wall is thus also made possible.

In a yet further embodiment, it is provided that each support disc has, in alternating fashion around its edge, two diametrically oppositely situated circular section edges and two diametrically oppositely situated flattened portions, wherein the flattened portions of a respective support disc run in each case parallel to one another. This yields the advantage that the circular section edges and the flattened portions interchange their positions by means of a simple rotation of the support discs, whereby it is possible, in one position of the support discs, for said support discs, in a first position, to be slid with their flattened portions under the collars, and for said support discs to then be rotated into a second position, whereby the circular section edges then interact with the collars so as to form an axial fixing facility.

For this purpose, it is advantageous if each of the bores is surrounded, on the inner side of the bearing wall, by in each case one collar over an angle of approximately 240°, wherein each collar is equipped with a respective collar edge and a respective collar opening. The collar openings thus advantageously make it possible for the support discs, in the first position, to be slid under the collars through the collar openings, where the support discs are then, in the second position, rotated and each form, together with the collars, an axial fixing facility of the readjustment device and of the driver device.

In a further embodiment, the collar openings are situated opposite one another. This yields the advantage that the readjustment device and the driver device, as a synchronization unit, are moved close together during the insertion into the application section of the brake caliper, in order that the support discs of said readjustment device and driver device can then be initially be positioned in the center between the collar openings, from where the readjustment device and the driver device can then be slid under the collars to the left and to the right. This yields a simple assembly process.

In a yet further embodiment, each collar edge of each collar has an internal radius which is smaller than an internal radius of the respectively associated bore. This gives rise to a projecting length of the collar edges for simple interaction with the support discs.

If each collar is equipped with diametrically arranged holding regions in relation to a respective bore central point, the support discs can each be fixed by means of a simple rotation through 90°. Other rotations are self-evidently also possible.

In a yet further embodiment, it is provided that, in an installed state of the synchronization unit, the flattened portions of the support discs of the readjustment device and of the driver device are all arranged parallel to one another, wherein said flattened portions run at right angles to an imaginary connecting line of bore central points of the bores. This simplifies the assembly process.

A further embodiment provides that, in the installed state of the synchronization unit, a bearing block is arranged between the readjuster device and the driver device, wherein the bearing block bears with a longitudinal side against the inner side of the bearing wall, wherein in each case one lateral holding section on a narrow side of the bearing block is in positively locking contact with in each case one flattened portion of each support disc and forms a rotation prevention facility for the support discs. Thus, by means of the bearing block, the rotation prevention facility can be made possible by means of a simple insertion.

In a yet further embodiment, the bearing block, with its longitudinal sides, forms guide sections for the synchronizer, for example a chain. The bearing block thus advantageously permits multiple functions. Furthermore, in a further embodiment, the bearing block advantageously forms a counterbearing for the brake rotary lever.

An additional rotation prevention facility can be realized in that the bearing arrangement of the readjustment device and/or the bearing arrangement of the driver device have in each case one fastening element between the respective support disc and the application section of the brake caliper. The fastening element may for example be a ball which is pressed into recesses, provided for the same, of the associated components support disc and brake caliper, and which gives rise to additional positive locking of said components.

Thus, a disc brake with a synchronization unit is created which can be installed into the application section into the bearing seats of the readjustment device and of the driver device through the bottom plate flange of the brake caliper. The synchronization unit can be introduced jointly as a fully assembled unit of readjustment device and driver device together with the synchronizer, for example the chain, through the bottom plate flange.

The following further advantages are achieved in this way:

(a) Simple and inexpensive synchronization,
(b) Simple assembly,
(c) Modular system for different disc brakes,
(d) The synchronization is fully integrated into the application section of the brake caliper, which is a cast part,
(e) A separate cover unit is not necessary.

In an alternative embodiment, it is provided that the bearing arrangement of the readjustment device has a bore in a bearing wall of the application section of the brake caliper, a bearing disc and a head plate with at least one cylinder segment and with at least one surface segment on the readjustment device. This permits advantageously simple installation and fixing of the readjustment apparatus in the bearing wall. This manner of installation may be used even in the case of disc brakes which have only one spindle unit. Situations are however also contemplated in which the readjustment device is arranged for example between the spindle units.

In a further embodiment, the head plate has a conical fastening section which points toward the interior space of the application section and which is fixedly connected to the bearing disc of the readjustment device, wherein the fastening section is connected, at its outer edge, to a disc section to which the at least one cylinder segment and the at least one surface segment are attached. This is advantageous because, in this way, a conventional bearing disc can be used with only minor enhancements. Components and structural space are thus saved.

A yet further embodiment provides that the at least one cylinder segment extends axially into the bore and is at least partially in positively locking contact with the bore, wherein the at least one surface segment extends radially outward and lies with a supporting surface on a counterpart surface on the inner side of the bearing wall of the application section around the bore. In this way, the functions of axial fixing and centering are advantageously made possible in one component.

If the at least one cylinder segment has at least one fixing section which is connected in positively locking fashion to at least one fastening recess of the bore, an advantageously simple fixing of the readjustment device in the bearing wall is thus formed. The bearing wall in the region of the bore is thus advantageously situated between the at least one surface segment and the at least one fixing section of the head plate. The positively locking connection may be realized for example by calking.

For this purpose, it is advantageous for the at least one fastening recess of the bore to be arranged at that end of the bore which is situated at the outer side of the bearing wall, because in this way, the positively locking connection can be produced easily from the outside owing to easy access.

Thus, a disc brake is provided whose synchronization unit has a readjustment device with a head plate with surface segments and cylinder segments. The synchronization unit or else merely the readjustment device alone can be inserted into the bore, provided for the same, in the bearing wall of the brake caliper and positioned with the planar surface segments of the head plate on counterpart surfaces, provided for the same, in the brake caliper, in this case on the inner side of the bearing wall. Radial positioning is realized by way of the cylinder segments. After the assembly of the remaining components, the correct angular position of the readjustment device is set by cyclic operation of the brake. Thereafter, the cylinder segments are, in fixing sections, pushed by use of a tool into fastening recesses, for example lateral pockets, formed for the purpose in the bore in the bearing wall of the brake caliper. This deformation process gives rise to positive locking, which ensures the fixing of the readjustment device in terms of its angular and axial positions.

The following further advantages are attained:
(a) Simple and inexpensive assembly,
(b) Dismounting is possible only in "destructive" fashion; no re-use of defective components,
(c) Secure fixing of the readjustment device by means of the most intense possible positive locking,
(d) No additional components required.

In another alternative embodiment, the bearing arrangement of the readjustment device has a bore in a bearing wall of the application section of the brake caliper, a support sleeve, a washer and a securing element. This advantageously yields the possibility of simple installation and fixing of the readjustment device in the bearing wall. This manner of installation may be used even in the case of disc brakes which have only one spindle unit. Situations are however also conceivable in which the readjustment device is arranged for example between the spindle units.

For this purpose, an embodiment provides that the support sleeve comprises a support body with a flange and comprises a radial toothing. This yields a compact component.

In a further embodiment, the radial toothing is formed as an external and straight toothing, wherein the teeth thereof extend, parallel to a support sleeve axis, over the outer surface of the support body. The toothing can be produced easily.

A yet further embodiment provides that the washer is formed as a type of ring-shaped disc with a ring body with a central opening, wherein the opening is equipped with an internal toothing which is formed as an internal straight toothing and which corresponds to the radial toothing of the support body of the support sleeve. The washer can be produced inexpensively as a simple punched part.

In a yet further embodiment, in the installed state of the readjustment device, the support sleeve is inserted into the bore such that the support body projects outward from the bearing wall through the bore, wherein a face surface of the flange bears against a supporting surface on the inner side of the bearing wall. This yields a simple assembly process.

It is furthermore provided that the washer is slid onto the support body from the outside, wherein the internal toothing of the washer and the radial toothing of the support sleeve are in engagement, wherein the washer bears against the outer side of the bearing wall and is fixed axially on the support body by means of the securing element.

Furthermore, the washer has at least one fixing section which are connected in positively locking fashion to at least one fixing section on the outer side of the bearing wall. There may also be two diametrically arranged fixing sections on the ring body. This permits simple and rapid fixing to the brake caliper, for example by means of a simple deformation process such as calking.

The following advantages are attained:
(a) Simple and inexpensive assembly,
(b) Secure fixing of the readjuster device by means of the most intense possible positive locking,
(c) No additional components required In a further embodiment of the method, in the method step (S1) of assembling, support discs are rotated about a respective axis such that flattened portions of the support discs run parallel to an imaginary connecting line of bore central points, wherein the readjuster device and the driver device are initially arranged adjacent to one another such that a spacing of a readjuster axis and a driver axis is smaller than a spacing of the bore central points. An advantageously compact construction for installation is thus made possible.

In a yet further embodiment, in the method step (S2) of inserting, circular section edges, which point toward a respective bore, of the support discs are arranged laterally in front of a respective collar opening of collars of the bores.

A further embodiment provides that, in the method step (S3) of mounting, in a first partial step, the readjuster device and the driver device are slid apart in the direction of the imaginary connecting line of the bore central points to such an extent that the support discs are slid, with the circular section edges, which point toward the respective bore, first, over the respective bore between the respective collar and the bearing wall until said circular section edges come to bear against a respective wall between collar and the bearing wall. This yields a simple assembly process without tools.

In a yet further embodiment, in the method step (S3) of mounting, in a second partial step, the support discs are each rotated through 90° about the readjuster axis and about the driver axis such that each circular section edge of the support discs is arranged between a respective holding region of the associated collar and the bearing wall of the application section of the brake caliper, wherein the synchronizer is tensioned. In this way, axial fixing is made possible by means of a simple 90° rotation.

Furthermore, in one embodiment, it is provided that, in the method step (S3) of mounting, in a third partial step, a bearing block is inserted through the bottom plate flange between the readjuster device and the driver device such that the bearing block bears with a longitudinal side against the bearing wall, tensions the synchronizer further and, with in each case one holding section, makes positively locking contact with a flattened portion of the support discs so as to form a rotation prevention facility for the support discs. This yields a simple and rapid assembly process.

For a further rotation prevention action, balls can then be pressed in between the brake caliper and support discs.

An advantageously simple method is thus realized in which no tools or only simple tools are necessary and which can be performed quickly and reliably.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 16 shows the enlarged view as per FIG. 15 during an assembly step.

FIG. 17 shows a schematic perspective view of a washer.

FIG. 18 shows a schematic perspective view of a support sleeve.

DETAILED DESCRIPTION OF THE DRAWINGS

Figure 1:
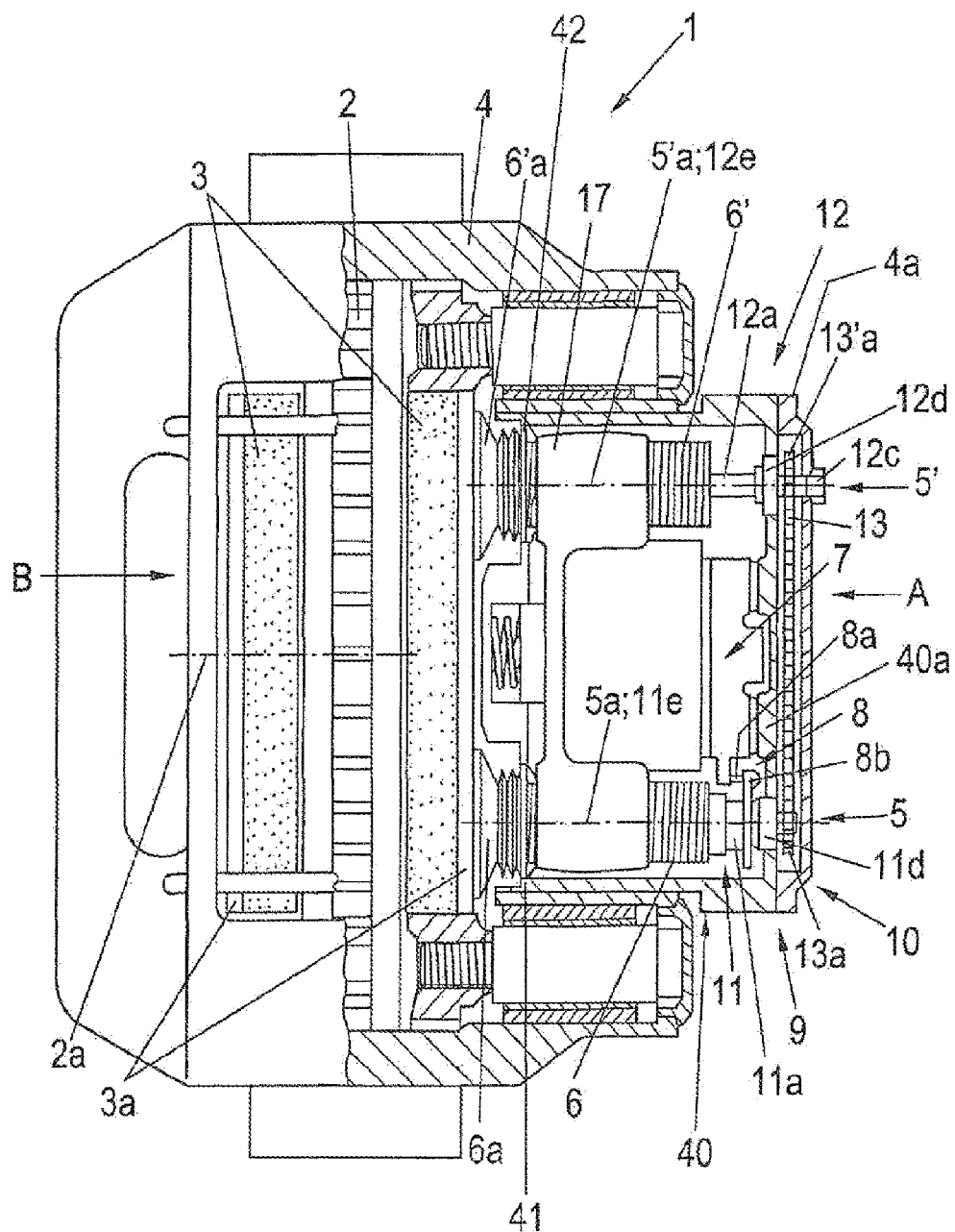
FIG. 1 shows a schematic partially sectional view of a conventional disc brake.

FIG. 1 shows a schematic partially sectional view of a conventional disc brake 1 in a plan view, with a wear-compensating readjustment apparatus 9 and a synchronization unit 10.

The disc brake 1 has a brake disc 2 with a brake disc axis 2a. The brake disc 2 is engaged over by a brake caliper 4, which in this case is designed as a floating caliper. On both sides of the brake disc 2, there is arranged in each case one brake pad 3 with in each case one brake pad carrier 3a. The disc brake 1 is in this case formed as a two-plunger brake with two spindle units 5 and 5' with in each case one threaded plunger 6, 6'. That side of the disc brake 1 which is situated on the right in FIG. 1 is referred to as application side A, and that side which is situated on the left is referred to as pad slot side B.

The application-side brake pad carrier 3a is connected via thrust pieces 6a, 6'a to the spindle units 5, 5' with a respective spindle axis 5a, 5'a at ends, pointing toward the brake disc 2, of the threaded plungers 6, 6'. The other brake pad carrier 3a is also referred to as reaction-side brake pad carrier 3a and is fixed in the brake caliper 4 on the other side of the brake disc 2. The threaded plungers 6, 6' are each arranged so as to be rotatable in threads in a crossmember 17.

The spindle axes 5a, 5'a of the spindle units 5, 5' lie parallel to one another and parallel to the brake disc axis 2a, wherein the spindle axes 5a, 5'a are arranged in a plane which is perpendicular to the brake disc 2.

The crossmember 17 and thus the threaded plungers 6, 6' are actuatable by an application apparatus, in this case a brake rotary lever 7 with a pivot axis at right angles to an axis of rotation of the brake disc axis 2a. The brake rotary lever 7 interacts with the crossmember 17, wherein the crossmember 17 is adjustable in the direction of the brake disc axis 2a toward the brake disc 2 by means of the brake rotary lever 7. A movement toward the brake disc 2 is referred to as an application movement, and a movement in the opposite direction is referred to as a release movement. A restoring spring (not discussed in any more detail) is received in the center of the crossmember 17 in a corresponding recess on the pad side of the crossmember 17 and is supported on the brake caliper 4. By means of the restoring spring, the crossmember 17 is, during the release movement, adjusted into the released position of the disc brake 1 as shown in FIG. 1.

The application apparatus with the threaded spindles 6, 6', the brake rotary lever 7 and the crossmember 17 is arranged on the application side A of the disc brake 1 in an interior space of an application section 40 of the brake caliper 4.

The interior space of the application section 40 is surrounded by an encircling wall arrangement and, on the side pointing toward the brake disc 2, is formed with a bottom plate flange 41 with an opening. Said opening is closed off by means of a removable bottom plate 42. Openings (not designated in any more detail) for the threaded plungers 6, 6' are formed into the bottom plate 42 and are sealed off with respect to the threaded plungers 6, 6' or the thrust pieces 6a, 6'a by means of suitable seals, for example corrugated bellows.

On that side of the application section 40 which is situated opposite the bottom plate flange 41 with the opening, a bearing wall 40a closes off the interior space of the application section 40 to the outside in the direction of the extended imaginary brake disc axis 2a. The bearing wall 40a is in this case covered by a cover 4a and serves for the attachment of a (compressed-air) brake cylinder (not shown).

The bearing wall 40a lies in a plane parallel to the brake disc 2.

A spacing between the brake pads 3 and the brake disc 2 in the released position is referred to as air gap. Said air gap becomes larger as a result of pad and disc wear. The increased air gap must be compensated in order that the disc brake 1 can maintain its peak performance. For this purpose, a so-called wear-compensating readjustment apparatus 9 is used, which is actuated by the brake rotary lever 7 via a drive 8.

The disc brake 1 may have different power drives. The brake rotary lever 7 is in this case for example pneumatically actuated. With regard to the construction and function of a pneumatic disc brake 1 with a wear-compensating readjustment apparatus 9, reference is made to the corresponding description of DE 197 29 024 C1.

The wear-compensating readjustment apparatus 9 is designed for the wear-compensating readjustment of a preset air gap, which is referred to as nominal air gap. The expression "readjustment" is to be understood to mean a decrease of the air gap. The preset air gap is determined by the geometry of the disc brake 1 and has a so-called design air gap.

The wear-compensating readjustment apparatus 9 in this case comprises a synchronization unit 10 with a readjustment device 11 and a driver device 12.

The synchronization unit 10 furthermore has a synchronizer 13, in this case for example a chain, and two synchronizing wheels 13a, 13'a, for example sprockets. The synchronizer 13 and the synchronizing wheels 13a, 13'a are in this case arranged between the bearing wall 40a of the application section 40 of the brake caliper 4 and the cover 4a, that is to say outside the application section 40. The synchronizer 13 couples the readjustment device 11 and the driver device 12d such that the rotational movements thereof take place synchronously. This will be discussed in more detail below.

The readjustment device 11 is arranged in one spindle unit 5 so as to be coaxial with respect to the latter, to the threaded plunger 6 thereof and to the associated spindle axis 5a. A readjuster axis 11e of the readjustment device 11 runs in the spindle axis 5a. The readjustment device 11 is inserted into the hollow threaded plunger 6 and has a readjuster shaft 11a and a readjuster output element 11b (see FIG. 3 and FIG. 7). The readjuster output element 11b is, within the threaded plunger 6, coupled rotationally conjointly thereto and so as to be displaceable in the longitudinal direction of the readjuster axis 11e and thus of the spindle axis 5a (see FIG. 7).

The drive 8 of the readjustment device 11 of the wear-compensating readjustment apparatus 9 comprises an actuator 8a, which is connected to the brake rotary lever 7, and a drive element 8b, which is coupled to the readjustment device 11.

The components and functional groups of the readjustment mechanism of the readjustment device 11 are coupled at the drive side to the drive element 8b and at the output side to the readjuster shaft 11a and to the readjuster output element 11b. A readjustment mechanism of said type is described in detail for example in document DE 10 2004 037 771 A1.

For the wear-compensating readjustment, positioning of the readjustment device 11 in the brake caliper 4 is necessary. This positioning involves firstly a mounting of the readjustment device 11, for example a cardanic mounting, and centering in a bore 14 of the brake caliper 4. Secondly, an angular position of the readjustment device 11 in the brake caliper 4 about the readjuster axis 11e is ensured by virtue of the angular position being fixed after setting and adaptation to the respective components has been performed. Fixing of the angular position is necessary in order that the function of the stop, which acts within the readjustment device 11, of the transmission mechanism with respect to the positionally fixed brake caliper 4 is effective.

This positioning of the readjustment device 11 is realized by means of a bearing arrangement.

The bearing arrangement of the readjustment device 11 comprises in this case a bearing disc 11d which is supported or inserted in the application-side bearing wall 40a of the application section 40 of the brake caliper 4 in the region of the application-side shaft end 11c of the readjustment device 11, which is secured against rotation and which, for example with a lug, thus forms a positionally fixed stop for the transmission mechanism of the readjustment device 11. A more detailed description in this regard emerges for example from the patent EP 2 307 753 B1.

The application-side shaft end 11c of the readjuster shaft 11a is arranged outside the application section 40 between the bearing wall 40a and the cover 4a and is connected rotationally conjointly to the synchronizing wheel 13a.

The driver device 12 has a driver shaft 12a with a driver output element 12b (see FIG. 3) and a driver axis 12e. The driver device 12 is arranged coaxially with respect to the other spindle unit 5', to the threaded plunger 6' thereof and to the spindle axis 5'a thereof. Here, the driver axis 12e lies in the other spindle axis 5'a. The driver shaft 12a is inserted with the driver output element 12b into the hollow threaded plunger 6' and is coupled rotationally conjointly to the threaded plunger 6' by means of the driver output element 12b, and is arranged so as to be displaceable in the longitudinal direction of the driver axis 12e and thus of the other spindle axis 5'a (see FIG. 7).

An application-side shaft end 12c of the driver shaft 12a is supported or mounted via a bearing disc 12d in the application-side bearing wall 40a of the application section 40 of the brake caliper 4, is coupled rotationally conjointly to the other synchronizing wheel 13'a and extends through the bearing wall 40a and the cover 4. Here, the application-side shaft end 12c is formed as an actuation end with a profile (not designated in any more detail here) for the engagement of a tool for the adjustment of the wear-compensating readjustment apparatus 9 during maintenance work, and is arranged so as to be accessible outside the cover 4a.

The spindle axes 5a, 5'a, the readjuster axis 11e, the driver axis 12e and the brake disc axis 2a of the brake disc 2 are arranged parallel to one another.

The readjustment device 11 and the driver device 12 are coupled via the synchronizer 13 such that a rotational movement of the threaded plunger 6 about its spindle axis 5a including the readjuster axis 11e effects a rotational movement of the threaded plunger 6' about its spindle axis 5'a including the driver axis 12e and vice versa. Here, the synchronizer 13 is arranged on the outer side of the application-side wall 40 of the application section 40 of the brake caliper 4. In this exemplary embodiment, the synchronizing wheels 13a, 13'a are sprockets and the synchronizer 13 is a chain. A synchronous movement of the threaded plungers 6, 6' of the spindle units 5 and 5' during wear-compensating readjustment processes (drive provided by the readjustment device 11) and setting processes during maintenance work, for example pad changes (manual drive by means of the actuation end of the driver device 12), is thus achieved.

In this conventional embodiment, the readjuster device 11 and the driver device 12 are initially inserted without the synchronizer 13 into the application section 40 of the brake caliper 4 from the pad slot side B. Here, the upper ends of the readjuster device 11 and of the driver device 12 extends to the outside through the bearing wall 40a. Then, the synchronizer 13 and the synchronizing wheels 13a, 13'a are mounted from the outside onto the upper ends, which project through the bearing wall 40a, of the readjuster device 11 and of the driver device 12.

Figure 2:
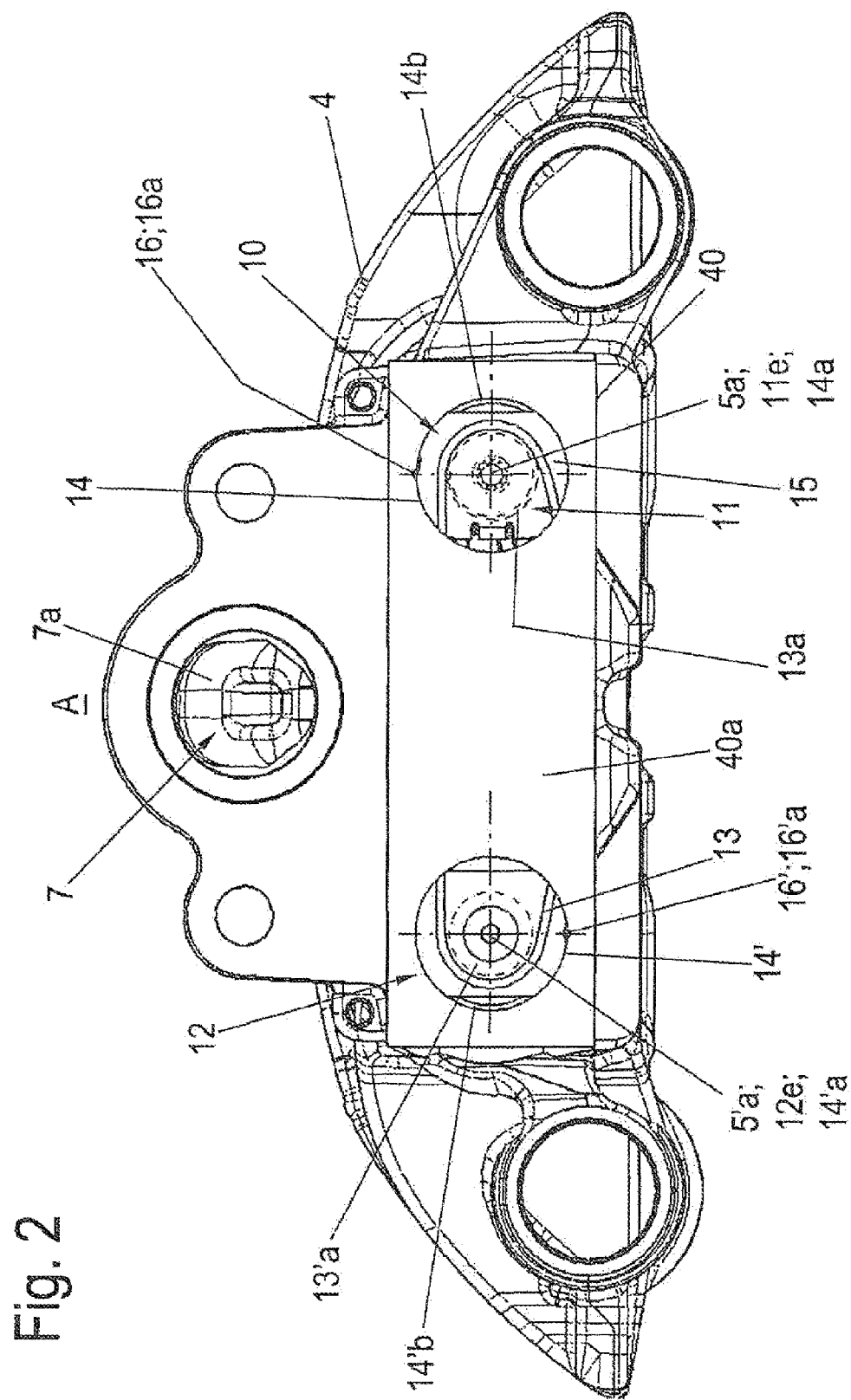
FIG. 2 shows a schematic view of an application side of a brake caliper of a first exemplary embodiment of a disc brake according to the invention with a synchronization unit.
Figure 3:
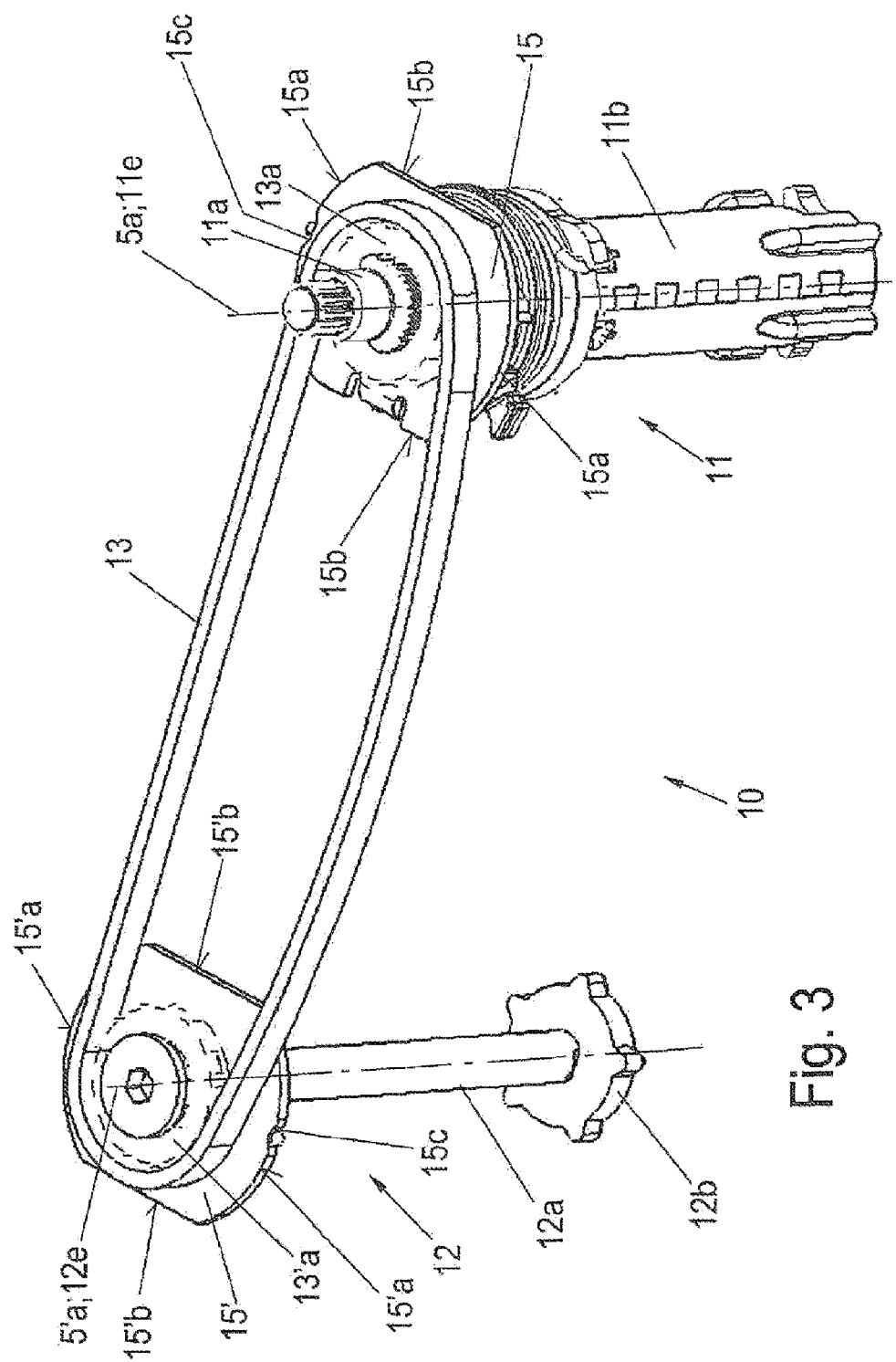
FIG. 3 shows a schematic perspective view of the synchronization unit of the first exemplary embodiment as per FIG. 2.

FIG. 2 illustrates a schematic view of an application side A of a brake caliper 4 of a first exemplary embodiment of a disc brake 1 according to the invention with a synchronization unit 10. FIG. 3 shows a schematic perspective view of the synchronization unit 10 of the first exemplary embodiment as per FIG. 2.

The application section 40 of the brake caliper 4 is, in the assembled state of the brake caliper 4 shown here, equipped with the application apparatus, of which in this case the brake rotary lever 7 with a lever arm 7a can be seen through an opening in the upper region of the application section 40. A brake cylinder (not shown) is attached via said opening, wherein the brake cylinder interacts, by means of an actuating rod or the like, through said opening with the lever arm 7a of the brake rotary lever 7, in a manner which will not be described in any more detail here.

Two bores 14, 14' with in each case one bore central point 14a, 14'a are formed in the bearing wall 40a of the application section 40 of the brake caliper 4. One spindle axis 5a and the readjuster axis 11e run through one bore central point 14a, which is arranged on the right in FIG. 2. The other spindle axis 5'a and the driver axis 12e run through the other bore central point 14'a. The readjustment device 11 is thus situated below the right-hand bore 14, and the driver device 12 is arranged below the other bore 14'.

FIG. 3 shows the assembled synchronization unit 10 with the readjustment device 11 and the driver device 12. The expression "assembled" is to be understood here to mean that all of the components of the synchronization unit 10, specifically the readjuster device 11, the driver device 12, the synchronizer 13 and the synchronizing wheels 13a, 13'a are assembled as a preassembled group. In this case, this means that the synchronizing wheel 13a is attached rotationally conjointly to the readjuster shaft 11a of the readjuster device 11, and the synchronizing wheel 13'a is attached rotationally conjointly to the driver shaft 12a of the driver device 12, and that the synchronizer 13, the chain, has been laid onto and is in engagement with the synchronizing wheels 13a, 13'a.

The synchronizer 13 is thus arranged on the upper ends of the readjustment device 11 and of the driver device 12.

Figure 4A:
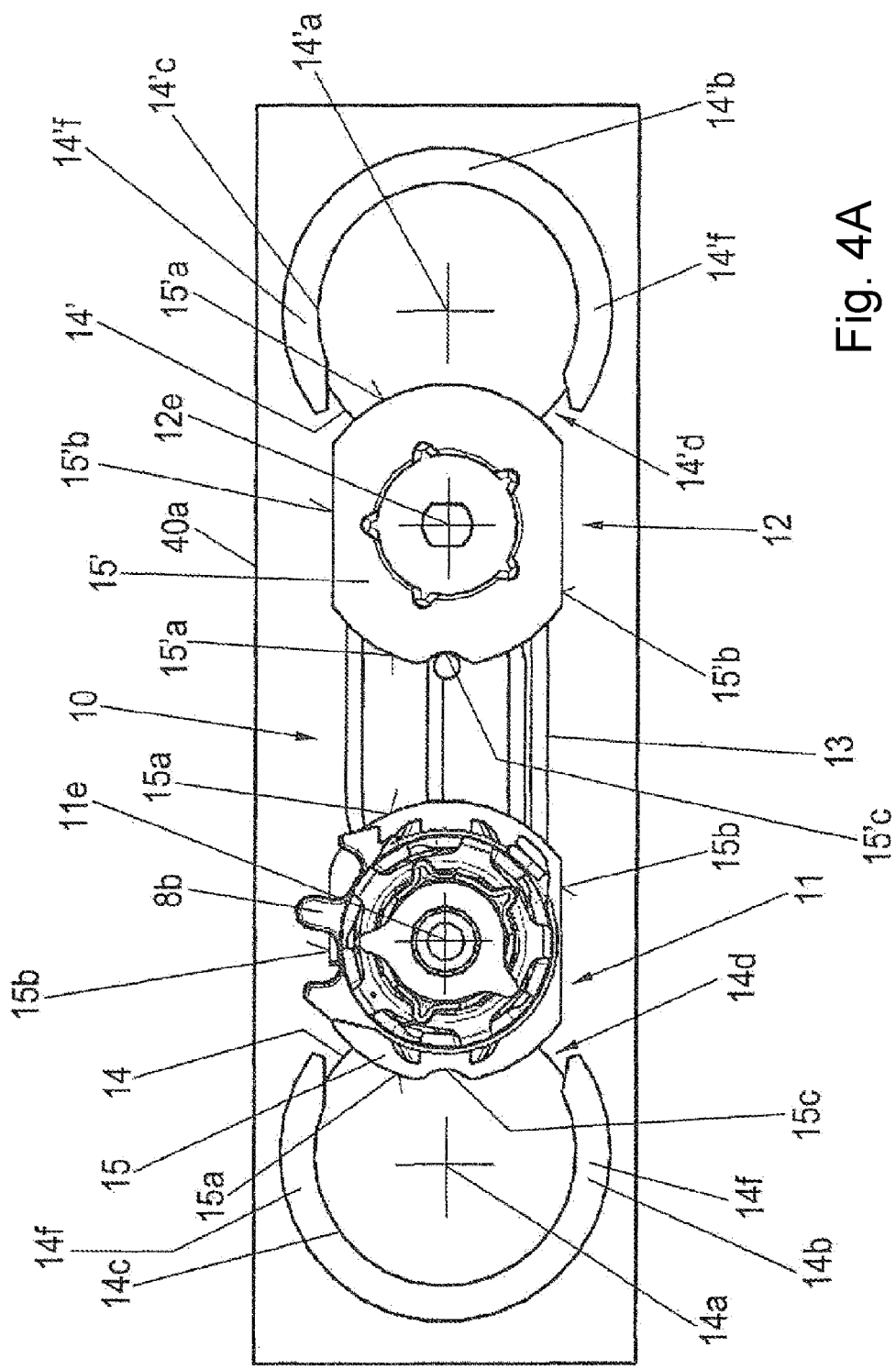
FIGS. 4A-E show schematic views of the synchronization unit as per FIG. 3 in different installation steps.

The synchronization unit 10 thus assembled is inserted as a whole, in an assembly position which is illustrated in FIG. 4A and which is described below, fully into the application section 40 of the brake caliper 4 through the bottom plate flange 41 and is then moved in further steps into the end position shown in FIG. 4C and FIG. 5. Retroactive mounting of the synchronizer 13 and of the synchronizing wheels 13a, 13'a is thus no longer necessary.

Figure 4B:
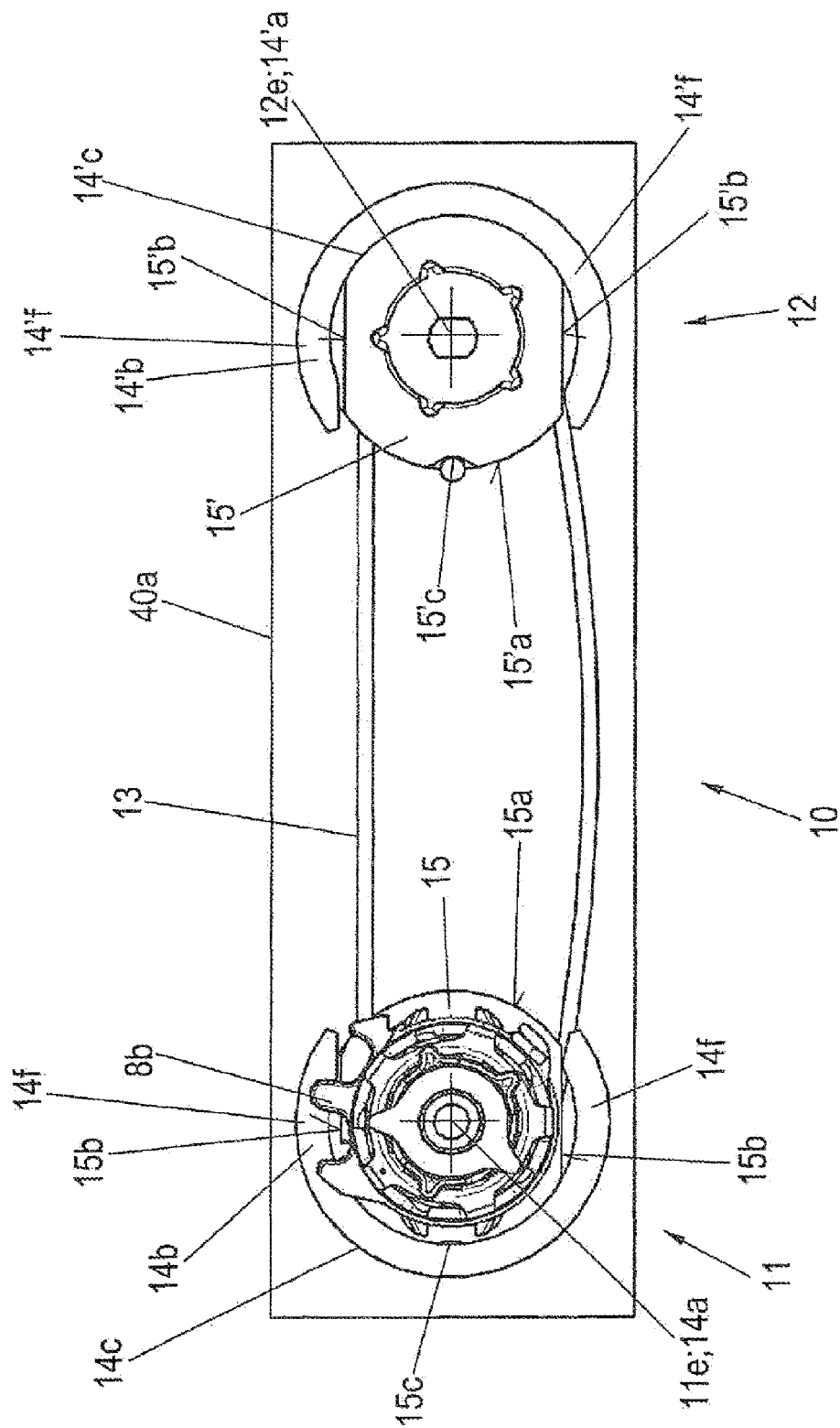
Figure 4C:
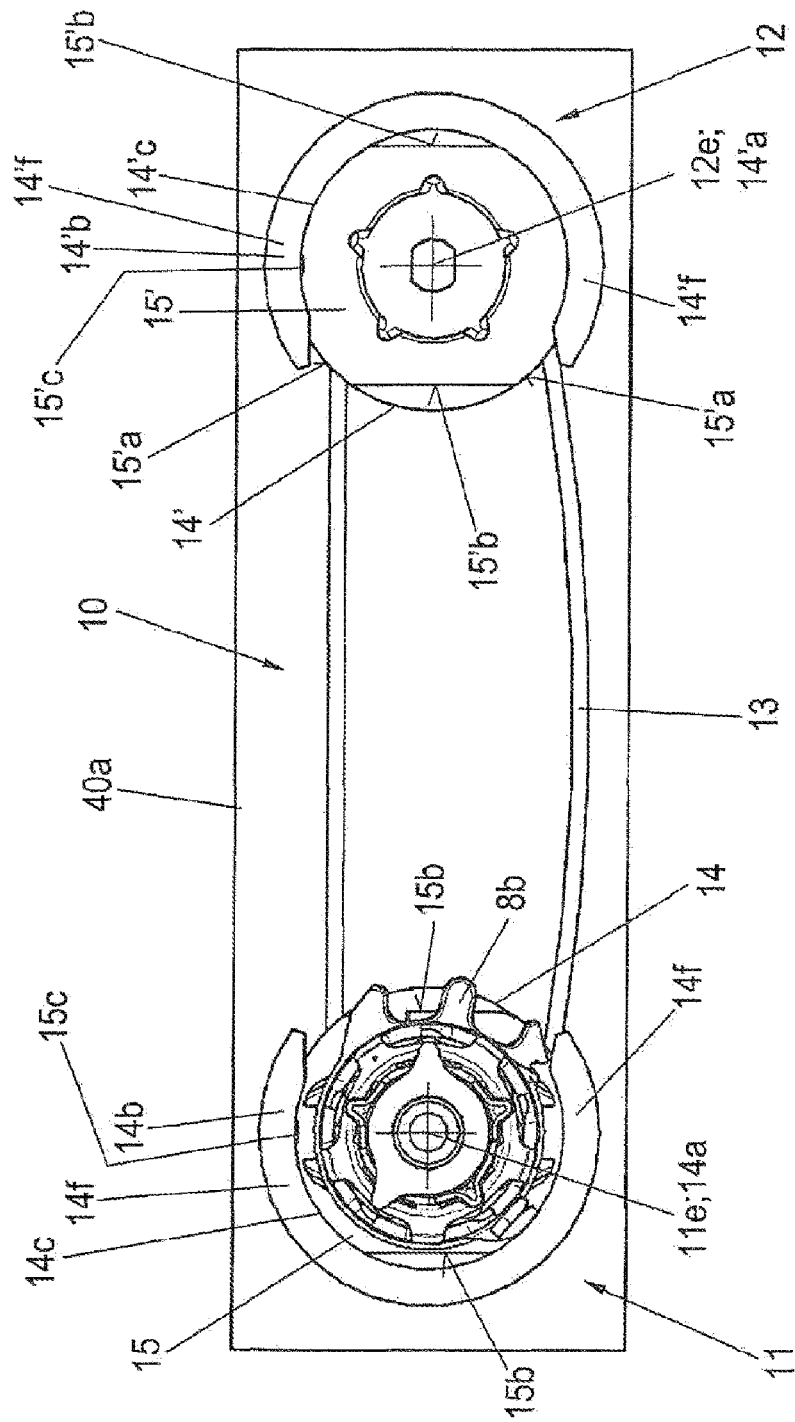

The synchronization unit 10 is illustrated in FIG. 3 in the position in which, as can be seen by way of indication in FIG. 2 through the bores 14, 14' and as shown in FIG. 4C, it is installed in its final position in the application section 40 of the brake caliper 4.

In this first exemplary embodiment, the bearing arrangement of the readjustment device 11 has the bore 14, a collar 14b, a support disc 15 and a bearing block 7b with a holding section 7d. Furthermore, the bearing arrangement may have a fastening element 16a.

The support disc 15 is arranged in a region of the upper end of the readjuster shaft 11a of the readjustment device 11, below the synchronizing wheel 13a connected rotationally conjointly to the readjuster shaft 11a, and, as a bearing slide, forms a bearing point for the readjuster shaft 11a.

The readjuster shaft 11a projects with an actuation end upward from the synchronizing wheel 13a yet further in the direction of the readjuster shaft 11e, which actuation end serves for manual actuation, for example during a resetting process. This will not be discussed in any more detail here.

FIG. 3 illustrates the readjuster output element 11b in the form of a sleeve. The driver output element 12b is attached rotationally conjointly to the lower end of the driver shaft 12a. Said output elements 11b, 12b will not be discussed in any more detail here.

The other support disc 15' is arranged in a region of the upper end of the driver shaft 12a of the driver device 12, below the synchronizing wheel 13'a connected rotationally conjointly to the driver shaft 12a, and forms a bearing disc with a bearing point for the driver shaft 12a.

In this way, a bearing arrangement of the driver device 12 on the bearing wall 40a of the application section 40 of the brake caliper 4 is formed. Said bearing arrangement of the driver device 12 comprises the bore 14', the collar 14'b, the support disc 15' and the bearing block 7b with a further holding section 7d. Said bearing arrangement of the driver device 12 may in addition also have a fastening element 16'a.

The synchronizer 13, the chain, is in engagement with the synchronizing wheels 13a, 13'a and is arranged above or on the support discs 15, 15'.

Each support disc 15, 15' has, in alternating fashion around its edge, two diametrically oppositely situated circular section edges 15a, 15'a and two diametrically oppositely situated flattened portions 15b, 15'b. The flattened portions 15b, 15'b run parallel to one another.

At least in each case one of the respective two circular section edges 15a, 15'a is equipped with a fastening section 15c, 15'c. The fastening section 15c, 15'c is formed here as a type of notch.

In the installed position, the support discs 15, 15' are arranged such that the two circular section edges 15a, 15'a are situated with in each case one fastening section 15c, 15'c facing a respective fastening recess 16, 16' of the application section 40 of the brake caliper 4, wherein a fastening element 16a is inserted between the respective fastening section 15c, 15'c and the respectively associated fastening recess 16, 16' and forms a rotation prevention facility for the respective support disc 15, 15' with respect to the application section 40 of the brake caliper 4. In this installed state, the support discs 15, 15' are held axially with their respective circular section edges 15a, 15'a between collars 14b, 14'b and the bearing wall 40a of the application section 40a of the brake caliper 4. This will be discussed in more detail below in conjunction with FIGS. 6A and 6B.

In the installed position of the synchronization unit 10 as shown in FIGS. 2 and 3, the flattened portions 15b, 15'b of the support discs 15, 15' are all arranged parallel to one another, wherein they run at right angles to an imaginary connecting line of the bore central points 14a, 14'a.

The mounting of the synchronization unit 10 (readjustment device 11 and driver device 12) with the components shown in FIG. 3 is performed from the brake disc side through the bottom plate flange 4 into the application section 40 of the brake caliper 4, and will be described in detail below.

Figure 6A:
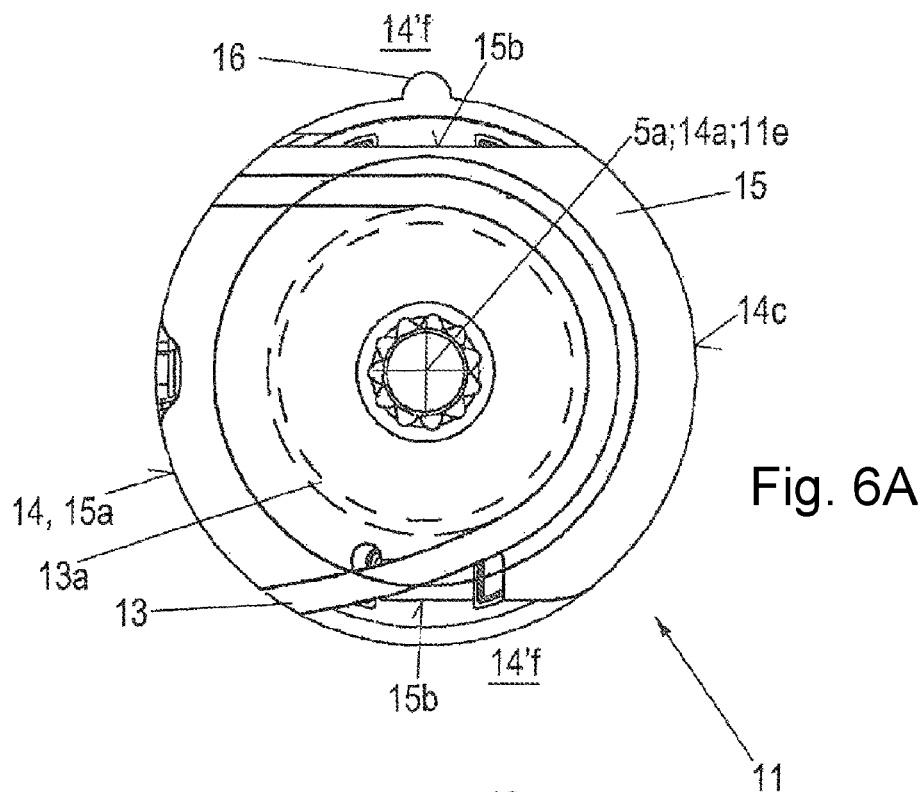
FIGS. 6A-B show enlarged schematic plan views of the synchronization unit as per FIG. 3 as viewed from the application side.
Figure 6B:
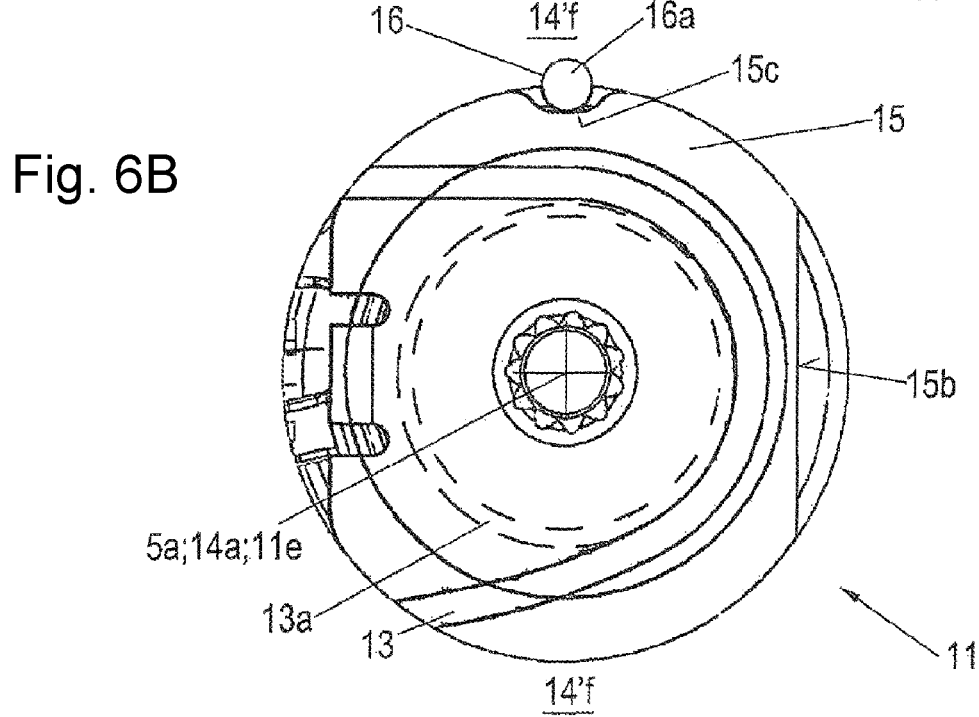
Figure 7:
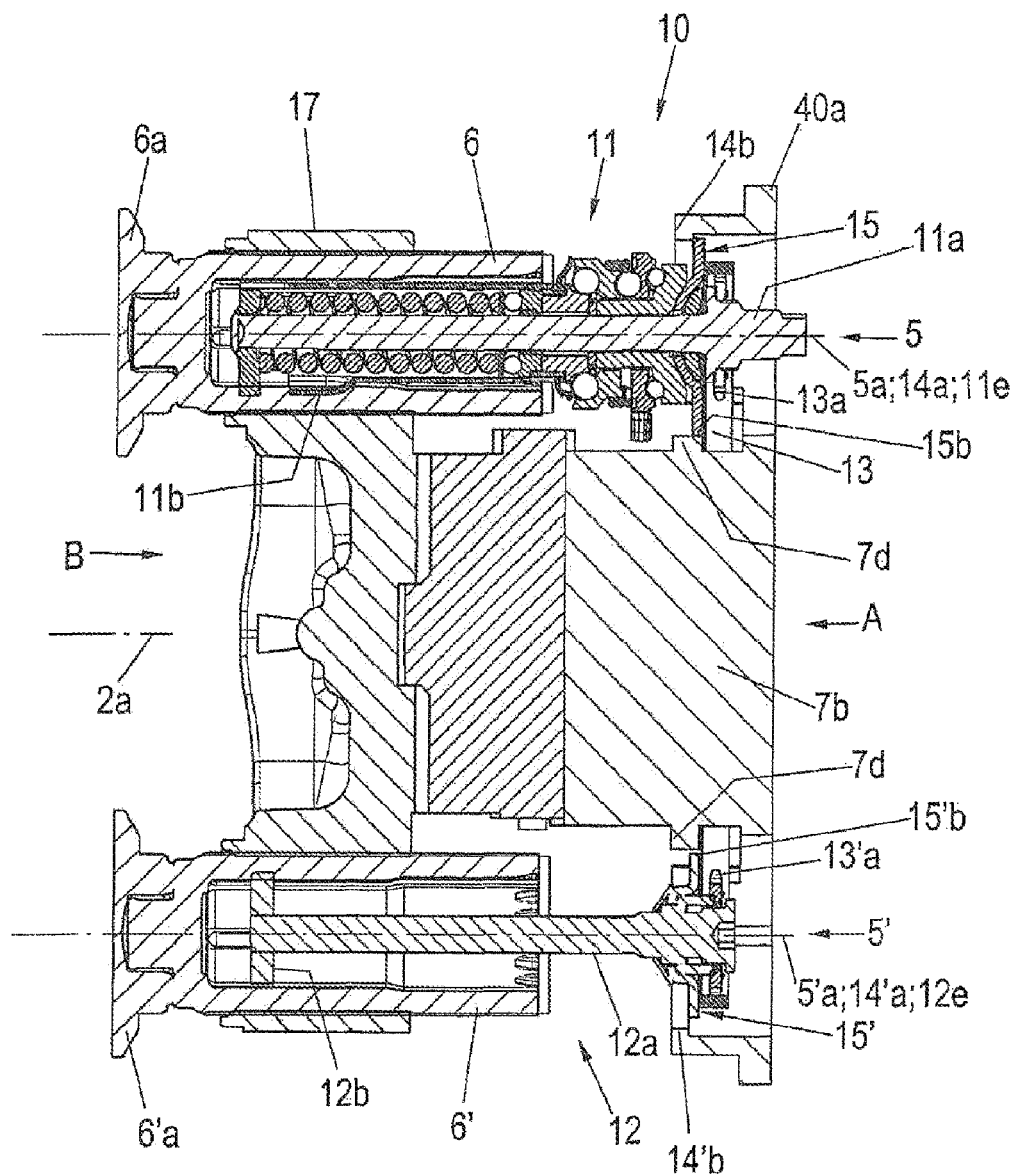
FIG. 7 shows a schematic partially sectional view of the synchronization unit with mounted crossmember.

FIGS. 4A-4E show schematic views of the synchronization unit 10 as per FIG. 3 in different installation positions as viewed from a pad slot side B or from the bottom plate flange 41 (see FIG. 1) of the disc brake 1 according to the invention. FIG. 5 shows a schematic partially sectional view of the disc brake 1 according to the invention with the synchronization unit 10 as per FIG. 3. FIGS. 6A-B show enlarged schematic plan views of the synchronization unit 10 as per FIG. 3 as viewed from the application side A. FIG. 7 illustrates a schematic partially sectional view of the synchronization unit 10 as per FIG. 3 with a mounted crossmember 17.

FIG. 4A shows a schematic view as viewed from the bottom plate flange 41, with the bearing wall 40a of the application section 40 being seen from the inside.

In each case one collar 14b, 14'b is arranged on the inner side of the bearing wall 40a around the bores 14, 14'. Each collar 14b, 14'b has a collar edge 14c, 14'c, the internal radius of which is smaller than an internal radius of the respectively associated bore 14, 14'.

Each collar 14b, 14'b is, at least with respect to the respective bore central point 14a, 14'a, arranged with diametrically arranged holding regions 14f, 14'f with a spacing to the inner side of the bearing wall 40a in the direction of the brake disc axis 2a. In the assembled state, the circular section edges 15a, 15'a, pointing toward the brake disc 2, are in each case in contact with the surfaces of the associated holding regions 14f, 14'f. Here, the holding regions 14f, 14'f of the collars 14b, 14'b form an axial fixing facility for the support discs 15, 15' in the direction of the brake disc axis 2a toward the brake disc 2.

Each collar 14b, 14'b surrounds the associated bore 14, 14' with its respective collar edge 14c, 14'c over an angle of approximately 240°, and is equipped with in each case one collar opening 14d, 14'd. The collar openings 14d, 14'd face toward one another. At the collar openings 14d, 14'd, the ends of the collar edges 14c, 14'c are equipped with bevels or insertion roundings (not shown, but understandable).

FIG. 4A shows the first installation step of the synchronization unit 10. The readjuster device 11 and the driver device 12 are inserted, together with the mounted synchronizer 13, the chain, from the side through the bottom plate flange 41 (see FIG. 1) into the interior of the application section 40 of the brake caliper 4 of the disc brake 1. The support discs 15, 15' are rotated about the respective axis 11e, 12e such that the flattened portions 15b, 15'b run parallel to the imaginary connecting line of the bore central points 14a, 14'a. Here, the readjuster device 11 and the driver device 12 are initially arranged adjacent to one another such that a spacing of the readjuster shaft 11e and of the driver shaft 12e is smaller than a spacing of the bore central points 14a, 14'a, and that those circular section edges 15a, 15'a of the support discs 15, 15' which point toward the respective bore 14, 14' are arranged in front of the respective collar opening 14d, 14'd.

In the next installation step, the end of which is shown in FIG. 4B and FIG. 6A, the readjuster device 11 and the driver device 12 are slid apart in the direction of the imaginary connecting line of the bore central points 14a, 14'a to such an extent that the support discs 15, 15' are slid, with the circular section edges 15a, 15'a, which point toward the respective bore 14, 14', first, over the respective bore 14, 14' between the respective collar 14b, 14'b and the bearing wall 40a until said circular section edges 15a, 15'a come to bear against the respective wall arrangement between collar 14b, 14'b and the bearing wall 40a. Said wall arrangement is not shown here but is easily understandable.

Here, the flattened portions 15b, 15'b point in each case toward the holding regions 14f, 14'f of the collars 14b, 14'b. Furthermore, the readjuster axis 11e now runs through the bore central point 14a of the left-hand bore 14 illustrated in FIG. 4B. In the same way, the driver axis 12e runs through the bore central point 14'a of the right-hand bore 14' shown in FIG. 4B. The chain, that is to say the synchronizer 13, has in this case been tensioned further.

Then, in a next installation step, the support discs 15, 15' are each rotated through 90° about the readjuster axis 11e and about the driver axis 12e. Here, for example, the support disc 15 of the readjustment device 11 is rotated clockwise, whereas the support disc 15' of the driver device 12 is rotated counterclockwise. The result is shown in FIG. 4C in a schematic view from the brake disc side, and in FIG. 5 in a schematic partially sectional view.

Each circular section edge 15a, 15'a of the support discs 15, 15' is now arranged between the respective holding region 14f, 14'f of the associated collar 14b, 14'b and the bearing wall 40a of the application section 40 of the brake caliper 4.

An axial fixing facility for the support discs 15, 15' and thus of the readjustment device 11 and of the driver device 12 toward the brake disc 2 in the direction of the brake disc axis 2a is formed by the collars 14b, 14'b.

In the opposite direction of the brake disc axis 2a, pointing away from the brake disc 2, an axial fixing facility is formed for example by means of support plates between the inner side of the bearing wall 40a and that side of the respective circular section edges 15a, 15'a of the support discs 15, 15' which points toward said inner side of the bearing wall 40a. It is also possible for grooves to be formed into the walls, which extend in the direction of the brake disc axis 2a and which are not designated, of the collars 14b, 14'b (FIGS. 5 and 7) underneath the collars 14b, 14'b, which grooves correspond to the thickness of the respective circular section edge 15a, 15'a of the support discs 15, 15'. The circular section edges 15a, 15'a of the support discs 15, 15' are then held in these grooves in the assembled state.

Fixing between the respective support disc 15, 15' and the associated bore 14, 14' is thus achieved.

The fastening sections 15c, 15'c are situated opposite the fastening recesses 16, 16' (see FIG. 2 and FIG. 6B).

Figure 5:
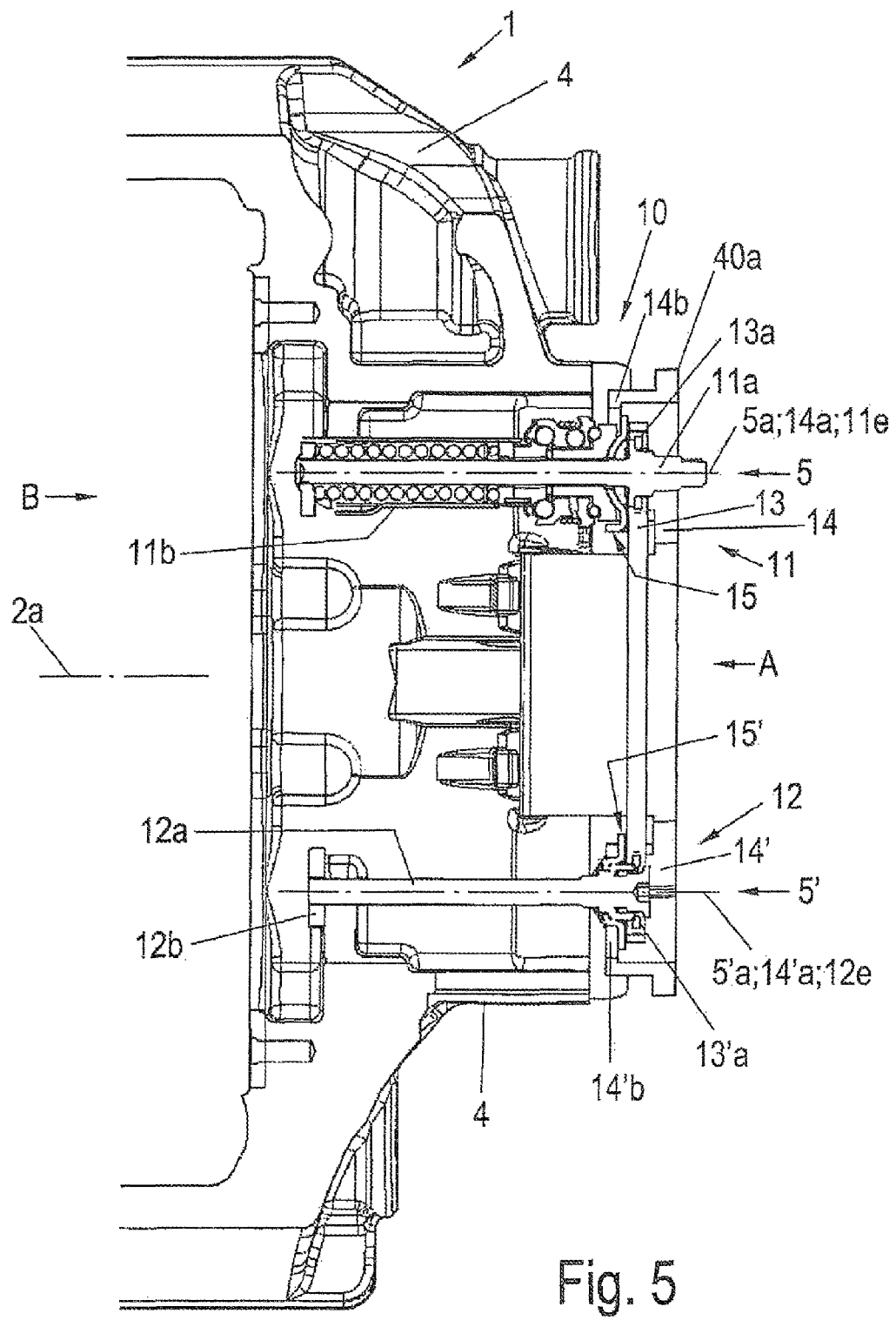
FIG. 5 shows a schematic partially sectional view of the disc brake according to the invention with the synchronization unit as per FIG. 3.

FIG. 5 shows the installed synchronization unit 10 in its final position in the application section 40 of the brake caliper 4. The application apparatus with brake rotary lever 7, spindle units 5, crossmember 17 and further components have not yet been installed.

Figure 4D:
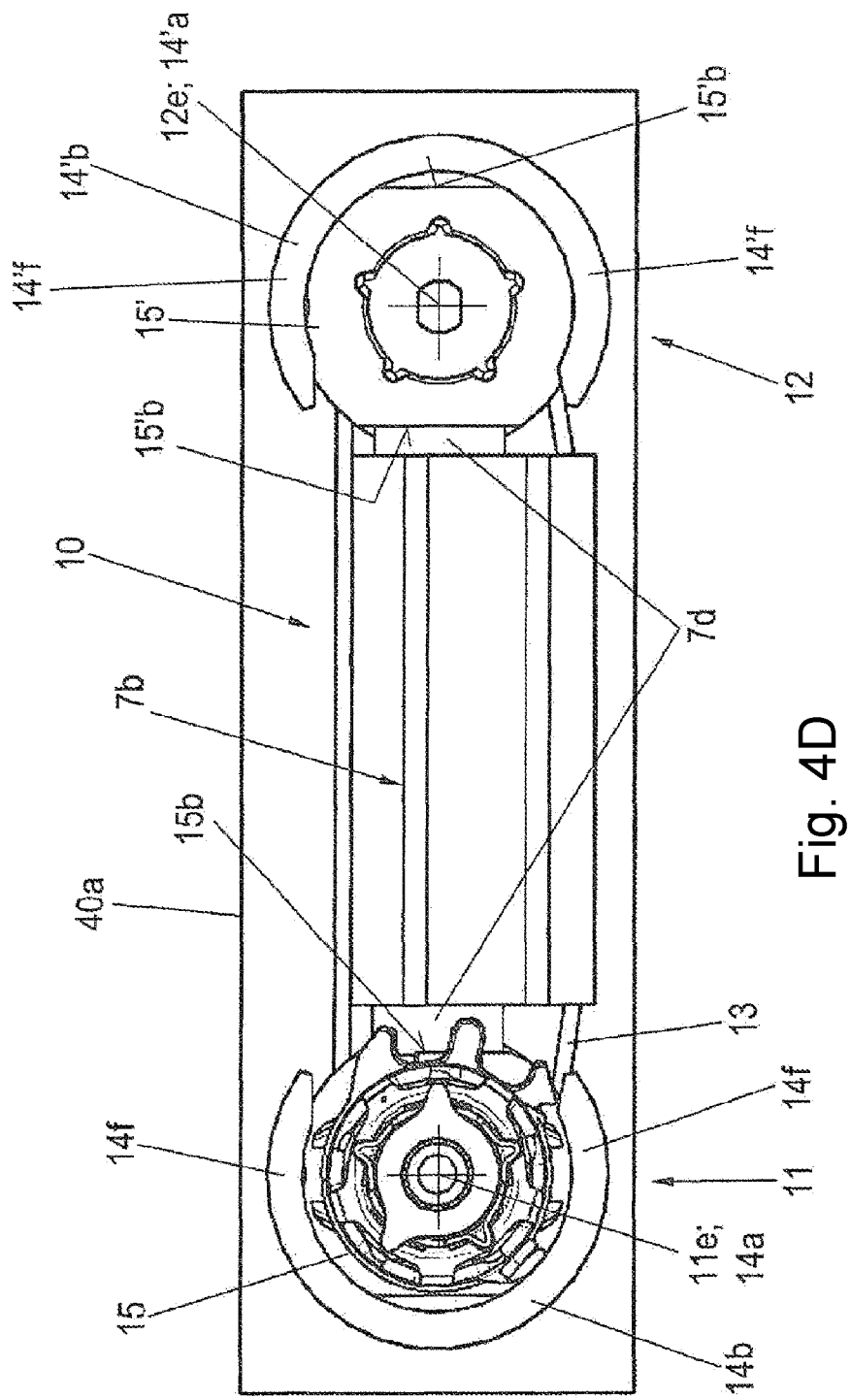
Figure 4E:
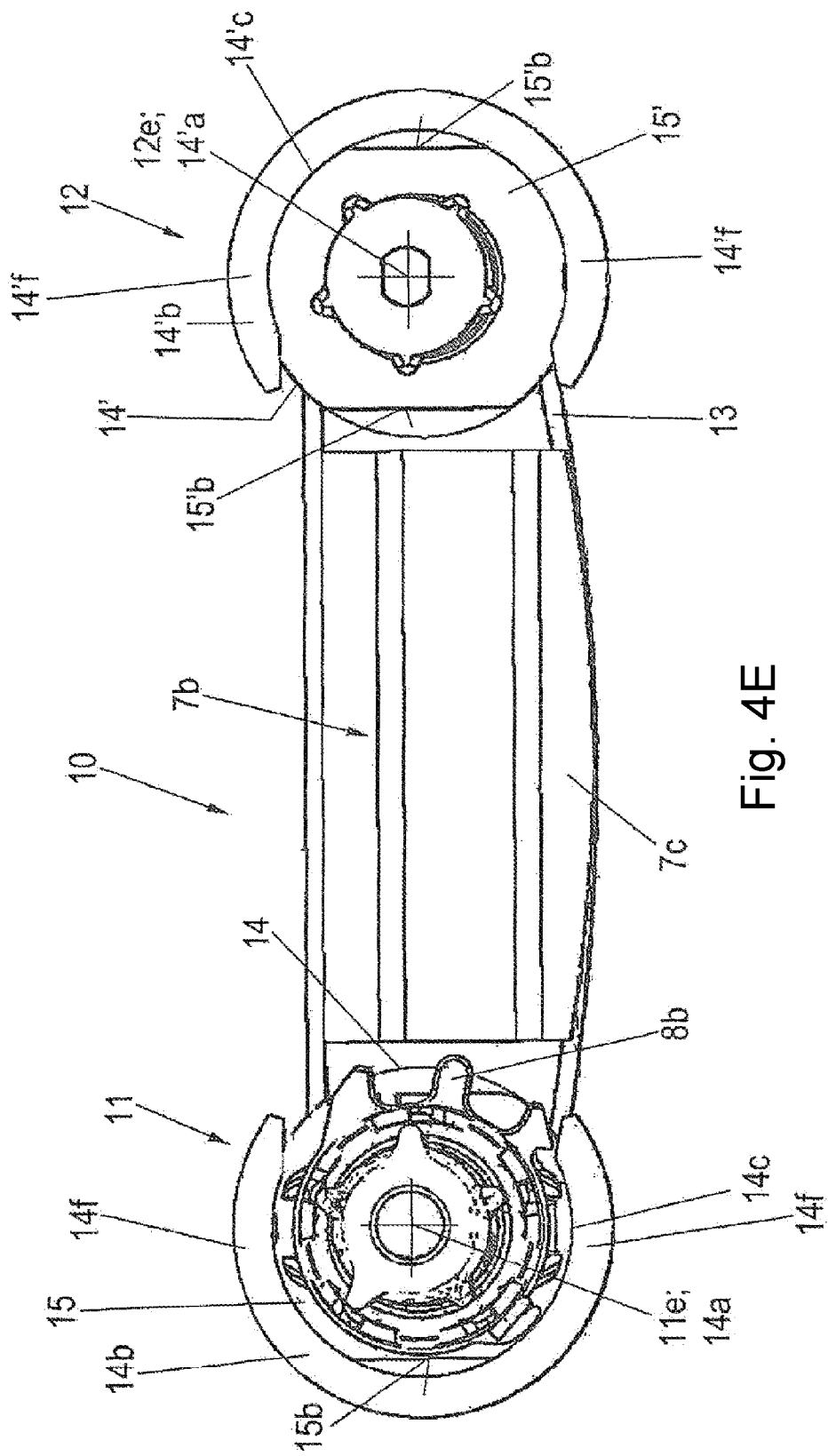

In a subsequent installation step, a bearing block 7b is inserted between the readjuster device 11 and the driver device 12, wherein the bearing block 7b bears with a longitudinal side against the bearing wall 40a (see FIGS. 4D-E and FIG. 7).

The bearing block 7b, by means of its longitudinal sides, forms guide sections for the synchronizer 13. For this purpose, one of the longitudinal sides has a slightly curved tensioning section 7c. In this way, the chain as synchronizer 13 is kept under tension and guided.

Furthermore, the bearing block 7b is equipped, at its narrow sides, with in each case one holding section 7d. Each holding section 7d makes positively locking contact with a flattened portion 15b, 15'b of the support discs 15, 15', and thus forms a rotation prevention facility for the support discs 15, 15'.

On that side of the bearing block 7b which points toward the bottom plate flange 41, said bearing block forms a counterbearing for the brake rotary lever 7 (see FIG. 7), in a manner not described in any more detail here.

A further radial fixing and rotation prevention facility for the support discs 15, 15' is shown by way of example for the support disc 15 of the readjuster device 11 and on an enlarged scale in FIG. 6B. Here, as already mentioned above, the fastening element 16a in the form of a ball is pressed in from the outside between the fastening section 15c of the support disc 15 and the associated fastening recess 16 of the application section 40 of the brake caliper 4, for example in the respective wall of each collar 14b, 14'b. A radial rotation prevention facility for the support disc 15 with respect to the application section 40 of the brake caliper 4 is thus formed.

Finally, the brake rotary lever 7 and the threaded plungers 6, 6' together with the crossmember 17 and further associated accessory parts (not described in any more detail here) are installed into the application section 40 of the brake caliper 4 from the pad slot side B. This is illustrated in a schematic partially sectional view in FIG. 7.

Figure 8:
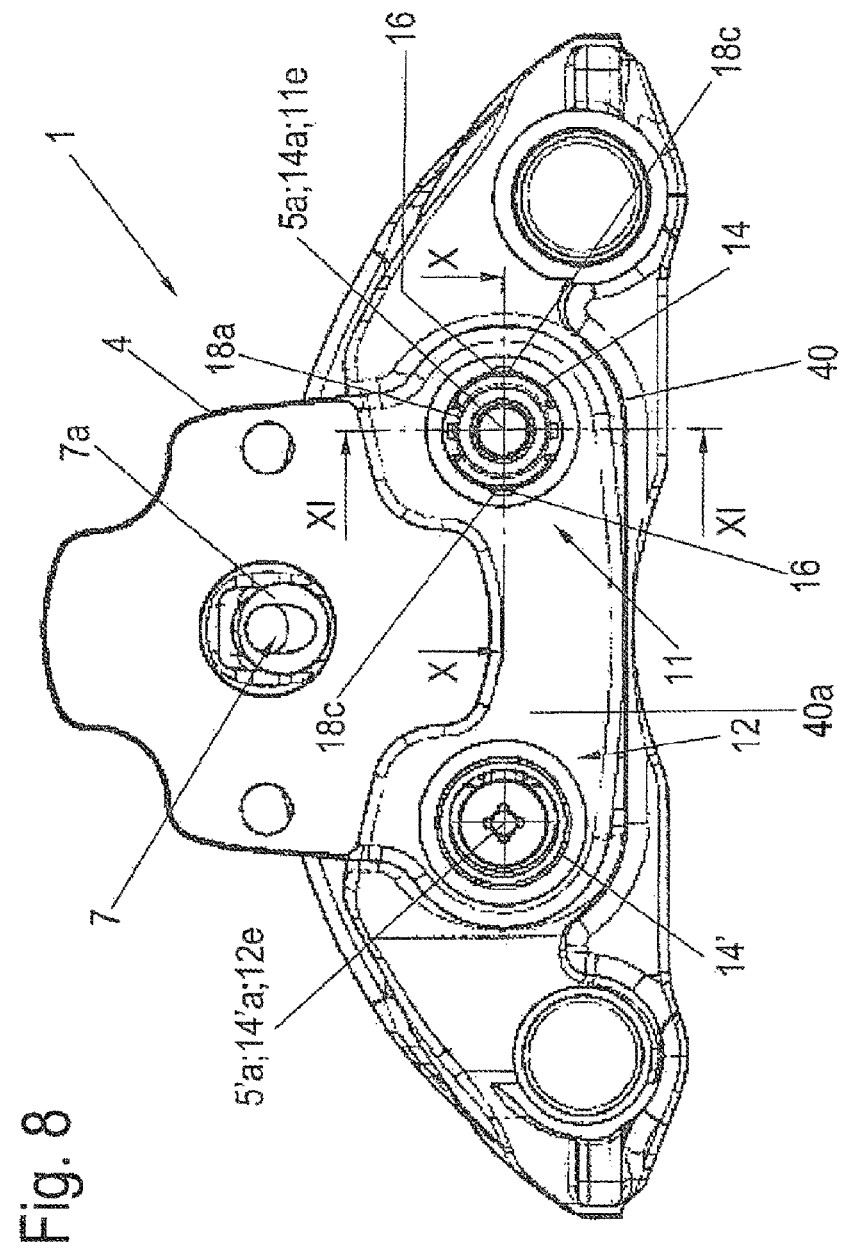
FIG. 8 shows a schematic view of the application side of a second exemplary embodiment of the disc brake according to the invention with a variant of a bearing arrangement.
Figure 9:
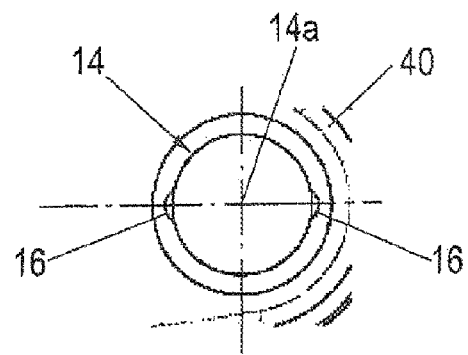
FIG. 9 shows a schematic plan view of a bore.
Figure 10A:
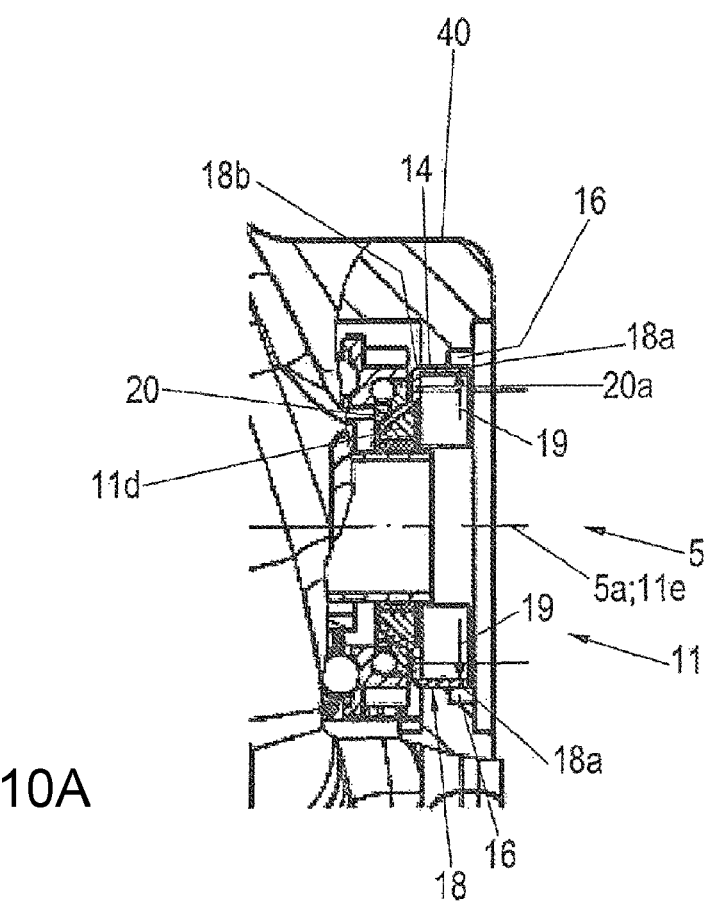
FIGS. 10A-B show enlarged sectional views as per the line X-X in FIG. 8.
Figure 10B:
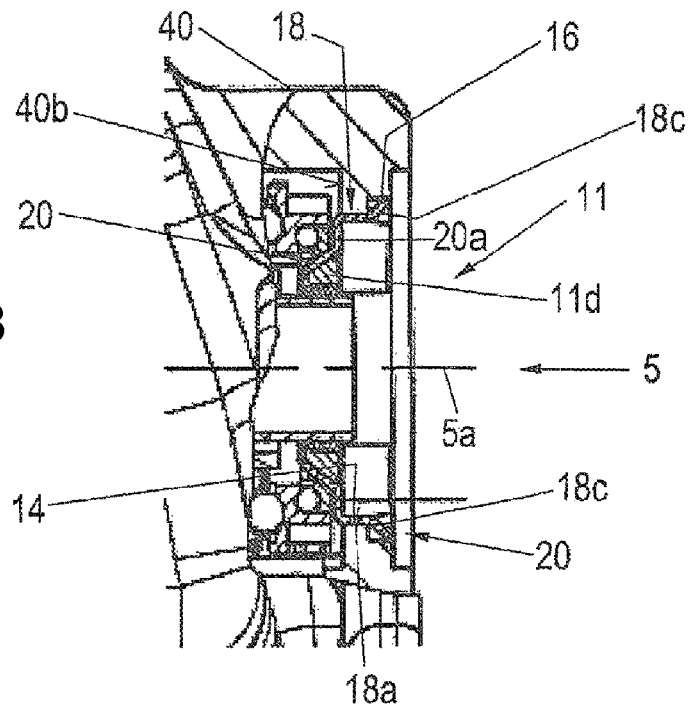
Figure 11:
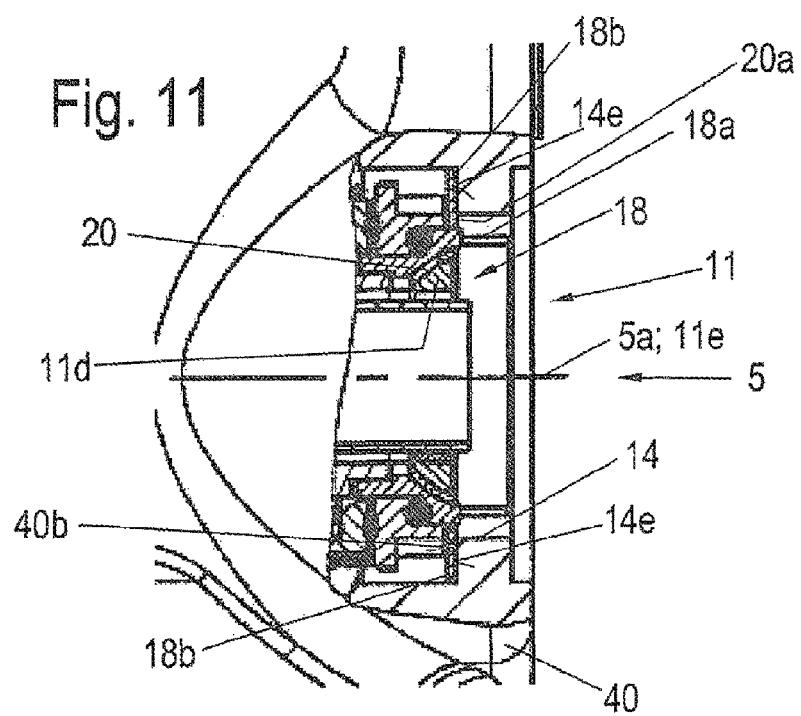
FIG. 11 shows an enlarged sectional view as per the line XI-XI in FIG. 8.

FIG. 8 illustrates a schematic view of the application side Z of a second exemplary embodiment of the disc brake 1 according to the invention with a variant of the bearing arrangement. FIG. 9 shows a schematic plan view of a bore 14 in the bearing wall 40a of the application section 40 of the brake caliper 4. FIGS. 10A and 10B illustrate enlarged sectional views as per the line X-X in FIG. 8. FIG. 11 shows an enlarged sectional view as per the line XI-XI as per FIG. 8.

In this second exemplary embodiment, the bearing arrangement of the readjustment device 11 has the bore 14 with a fastening recess 16, and a head plate 18 with cylinder segments 18a and surface segments 18b.

The application section 40 of the brake caliper 4 has already been described in detail above in conjunction with FIG. 2. In this second exemplary embodiment, the bearing arrangement of the readjustment device 11 and also that of the driver device 12 are designed differently than in the first exemplary embodiment.

The two bores 14, 14' with their bore central points 14a, 14'a are formed in the bearing wall 40a of the application section 40 of the brake caliper 4 as in the first exemplary embodiment. The readjustment device 11 is arranged below or behind the right-hand bore 14 in the application section 40, wherein the driver device 12 is situated below or behind the other bore 14'.

The synchronization unit 10 with the readjuster device 11 and the driver device 12 is arranged within the application section 40 below or, in the view as per FIG. 8, behind the bearing wall 40a. Here, the synchronizer 13 and the synchronizing wheels 13a, 13'a are situated, directly behind the bearing wall 40a, within the application section 40.

The fastening of the readjustment device 11 in the bore 14 is performed by means of a head plate 18 which, at one side, is fixedly connected to the bearing disc 11d of the readjustment device 11 and, at the other side, after the positioning of the readjustment device 11, is fixed axially with cylinder segments 18a and radially with surface segments 18b in the correspondingly designed bore 14. This will be discussed in detail below.

The head plate 18 has a conical fastening section 20 which points towards the interior space of the application section 40 and which is fixedly connected to the bearing disc 11d of the readjustment device 11 (FIG. 10A). The fastening section 20 is connected at its outer edge to a disc section 21 to which the cylinder segments 18a and the surface segments 18b are attached. The disc section 20a lies in a plane which runs substantially parallel to the brake disc 2 and which lies perpendicular to the readjuster axis 11e. The cylinder segments 18a extend axially into the bore 14, wherein the surface segments 18b extend radially outward. The cylinder segments 18a and the surface segments 18b are arranged in alternating fashion around the outer circumference of the disc section 20a of the head plate 18. This can be seen by way of indication in FIG. 8 and is shown in section in FIGS. 10A, 10B and 11.

The readjustment device 11 is inserted into the bore 14 provided in the bearing wall 40a of the application section 40 of the brake caliper 4 from the pad slot side B, such that the planar surface segments 18b lie with their supporting surfaces 18d on a counterpart surface 40b on the inner side of the bearing wall 40a of the application section 40 around the bore 14. In this way, axial positioning of the readjustment device 11 in an axial direction is initially realized only in one direction in relation to the wall 40.

The cylinder segments 18a are arranged in the bore 14 such that they bear with their outer surfaces against the bore inner wall, whereby radial positioning or centering of the readjustment device 11 is realized. Furthermore, the cylinder segments 18a have, in their edge regions, fixing sections 18c which are designed for interacting with a respective fastening recess 16 of the bore 14. Said fastening recesses 16 are formed into the bore 14 in an outer edge region of the latter (see FIGS. 9 and 10A). In the example shown, two fastening recesses 16 with two fixing sections 18c are specified. A greater or smaller number is self-evidently also possible.

The driver device 12 is fixed axially with its bearing disc 12d (see FIG. 1) in the bore 14' arranged on the left in FIG. 8 in a manner not described in any more detail by means of a bore securing ring (not shown), wherein fixing in terms of the angular position is realized for example by means of a pressed-in fastening element, similarly to that already discussed above. This will not be discussed in any more detail here, and is easily conceivable.

After the mounting of the application device into the application section 40 of the brake caliper 4, a correct angular position of the readjustment device 11 about the readjuster axis 11 and the spindle axis 5a and the bore central point 14 is set by cyclic operation of the disc brake 1. The expression "cyclic operation" is to be understood to mean short application processes of the disc brake 1.

Thereafter, the cylinder segments 18a, in their fixing sections 18c, are pushed in each case into one of the fastening recesses 16 of the bore 14 of the brake caliper 4 by means of a tool with a direction of action 19 pointing radially outward in relation to the bore central point 14a (FIG. 10a). This deformation process gives rise to positive locking, which ensures the fixing of the readjustment device 11 both in terms of angular position and in the other axial direction in the direction of the brake disc 2. This is illustrated in FIG. 11.

Figure 12:
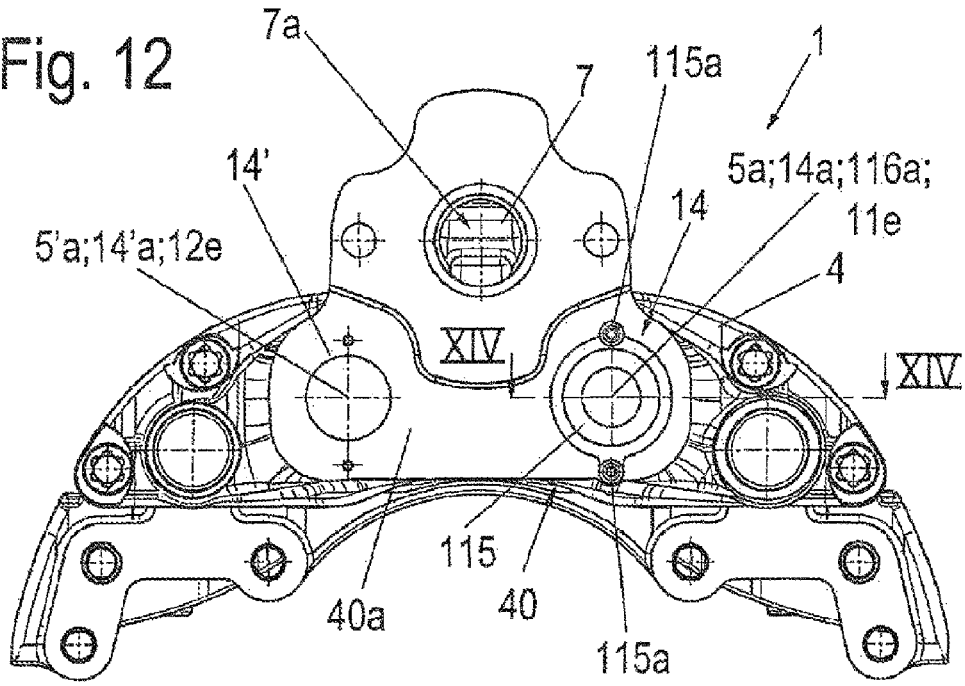
FIGS. 12-13 show schematic views of an application side of a third exemplary embodiment of the disc brake according to the invention with a further variant of the synchronization unit.
Figure 13:
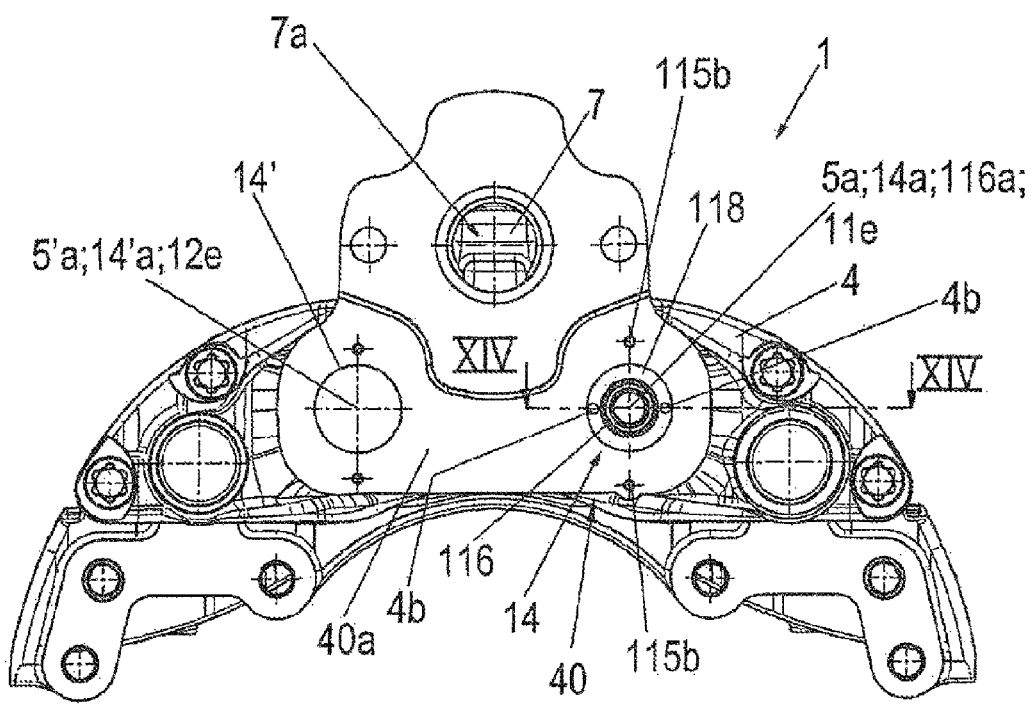
Figure 14:
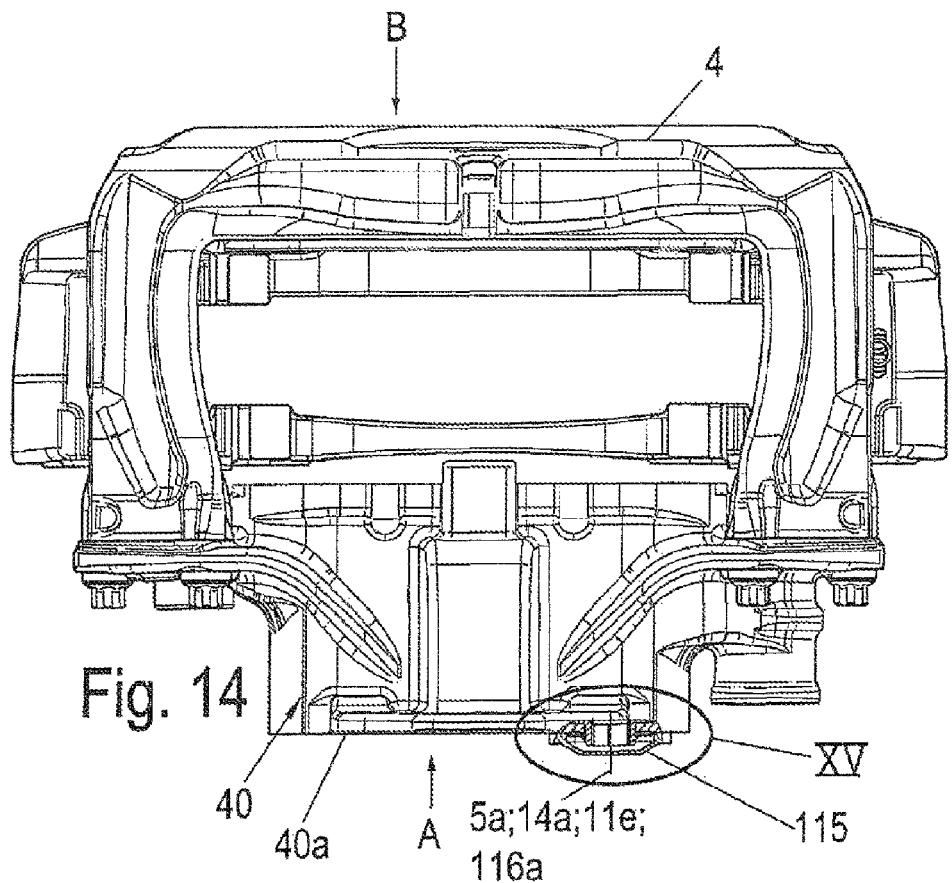
FIG. 14 shows a schematic plan view of a brake caliper with a partially sectional view along the line XIV in FIGS. 12-13.
Figure 15:
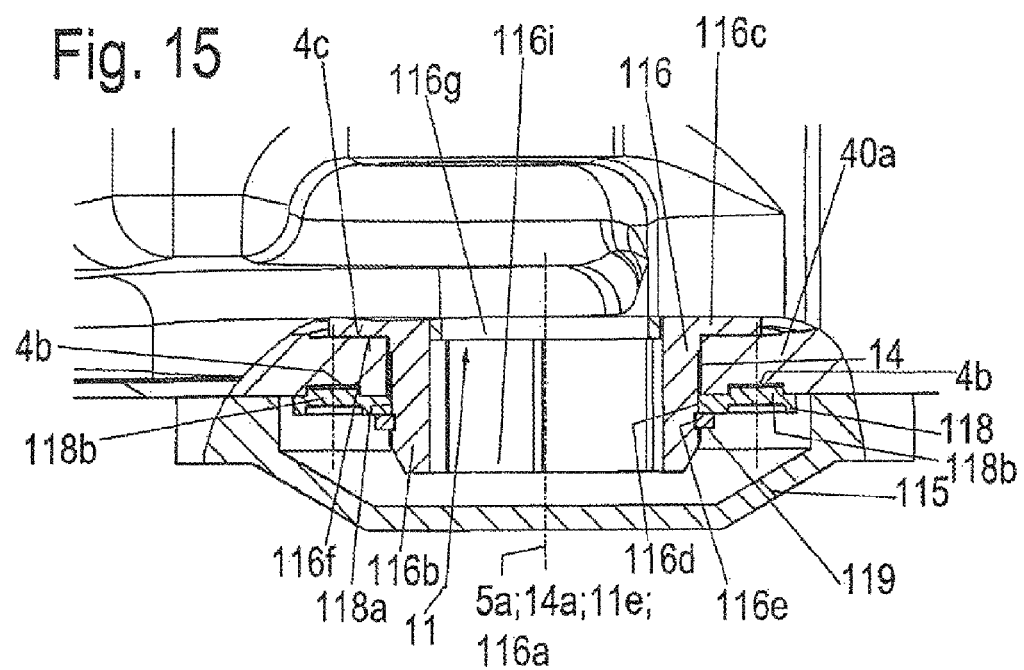
FIG. 15 shows an enlarged view of the region XV from FIG. 14.

FIGS. 12 and 13 show schematic views of an application side A of a third exemplary embodiment of the disc brake 1 according to the invention with a further variant of the synchronization unit 10. FIG. 14 shows a schematic plan view of a brake caliper 4 with a partially sectional view along the line XIV in FIGS. 12 and 13. FIG. 15 shows an enlarged view of the region XV from FIG. 14. FIG. 16 shows the enlarged view as per FIG. 15 during an assembly step. A washer 118 is illustrated in FIG. 16 in a schematic perspective view. FIG. 18 illustrates a schematic perspective view of a support sleeve.

In the third exemplary embodiment, the bearing arrangement of the readjustment device 11 comprises the bore 14, a support sleeve 116, a washer 118 and a securing element 119.

The brake caliper 4 is, with regard to its application section 40 with the bores 14, 14' and the introduction and arrangement of the synchronization unit 10 with the readjustment device 11 and the driver device 12, of similar construction to the second exemplary embodiment as per FIG. 8. Reference is made to the description above, wherein only the differences will be discussed here.

By contrast to the second exemplary embodiment, a contour with two fixing sections 4b in the region of the bore 14 is provided on the outer side of the bearing wall 40a of the application section 40 of the brake caliper 4. The two fixing sections 4b are for example blind bores, which are arranged diametrically with respect to the bore central point 14a of the bore 14. In FIG. 13, said fixing sections both lie in a plane, which is horizontal with respect to the drawing, of the bore central points 14a and 14'a or of the spindle axes 5a, 5'a.

In the third exemplary embodiment, the readjustment device 11 is also positioned by means of the bore 14 in the bearing wall 40a of the application section 40 of the brake caliper 4, but, by contrast to the second exemplary embodiment, is fixed in terms of its angular position and axial direction with respect to the brake caliper 4 by means of a support sleeve 116 and a washer 118. Here, the support sleeve 116 is connected in a manner which is not shown, but which is easily conceivable, to the readjustment device 11, for example to the bearing disc 11d thereof, or forms the bearing disc 11d of said readjustment device. In the assembled state of the disc brake 1, the bore 14 is closed off, and is sealed off with respect to the outside, by means of a closure cover 115.

The driver device 12 is positioned in the bearing wall 40a as in the second exemplary embodiment.

The support sleeve 116 comprises a support sleeve axis 116a, a support body 116b, a flange 116c and a radial toothing 116d.

Also shown in FIG. 18 is a projection 116g with a profiling 116h. Said projection 116g may for example be an upper end readjustment device 11 or an intermediate part with respect to or of the bearing disc 11d of the readjustment device 11, and will not be considered in any more detail here.

The support body 116b is a hollow circular cylinder with a passage opening 116i which has an internal profile 116j, 116k. The internal profile 116j, 116k corresponds to the profiling 116h of the projection 116g.

The outer surface of the support body 116b is equipped with the radial toothing 116d. The radial toothing 116d is in this case formed as an external and straight toothing, wherein the teeth extend parallel to the support sleeve axis 116a over the outer surface of the support body 116, starting at one end of the support body 116, as far as the other end of the support body 116b to a point a short distance in front of the flange 116c.

The other end of the support body is fixedly connected to the flange 116c. A face surface 116f of the flange 116c points towards the radial toothing 116d of the support body 116b. One end of the support body 116b is equipped with a bevel, by means of which the ends of the teeth of the radial toothing 116d are also beveled. An encircling groove 116e is formed into the radial toothing 116d, which groove is arranged with a spacing to the other end of the support body 116b, which spacing amounts to approximately one quarter of the total length of the support body 116b.

The washer 118 is illustrated in a perspective view in FIG. 17. The washer 118 is a type of ring-shaped disc, the ring body of which has a central opening 118c. The encircling inner side of the opening 118c is equipped with an internal toothing 118a. Said internal toothing 118a is formed as an internal straight toothing and corresponds to the radial toothing 116d of the support body 116b of the support sleeve 116. Furthermore, the washer 118 has in this case two diametrically arranged fixing sections 118b on the ring body.

During the assembly process, the support sleeve 116 is inserted into the bore 14 from the inner side of the application section 40 of the brake caliper 4 such that the support body 116b projects outward through the bore 14. Here, the face surface 116f of the flange 116c lies on a supporting surface 4c on the inner side of the bearing wall 40a. Said supporting surface 4c may be machined, for example by milling.

Between the radial toothing 116d of the support body 116b and the flange 116c, there is formed a narrow shaft projection which bears against the inner wall in the bore 14 and forms a centering facility. The radial toothing 116d furthermore extends through the major part of the bore 14.

The washer 118 is then slid with its internal toothing 118a onto the radial toothing 116d, which projects with the support body 116b of the support sleeve 116 out of the bore 14 to the outside. Beforehand, the washer 118 is rotated such that its fixing sections 118b are situated opposite the fixing sections 4b of the bearing wall 40a (see also FIG. 13).

Here, the bevel of the support body 116b makes it easier for the internal toothing 118a to be threaded in for engagement with the radial toothing 116b of the support body 116b. The washer 118 is slid until it makes contact with the outer surface of the bearing wall 40a, and is fixed axially relative to the support body 116b of the support sleeve 116 by virtue of a securing element 119, for example a shaft securing ring, being inserted into the groove 116e of the support body 116b. In this way, the support sleeve 116 is, by means of its flange 116c and by means of the washer 118 with the securing element 119, fixed axially with respect to the bearing wall 40a of the application section 40 of the brake caliper 4. Thus, the readjustment device 11 that is coupled or connected to the support sleeve 116 is also fixed axially to the brake caliper.

The washer 118 is, by means of its internal toothing 118a which is in rotationally conjoint engagement with the radial toothing 116d of the support sleeve 116, connected rotationally conjointly to the support sleeve 116b.

After corresponding adaptation of the readjustment device 11 connected to the support sleeve 116, as already described above, the fixing sections 118b of the washer 118 are connected to the fixing sections 4b of the contour of the bearing wall 40a of the brake caliper 4, for example by calking. Positive locking is thus realized between the washer 118 and the bearing wall 40a, that is to say brake caliper 4. By means of the thus formed calked contour of the fixing of the washer 118 to the bearing wall 40a, the support sleeve 116 that is connected rotationally conjointly to the washer 118 by means of the toothings 118a, 116d is fixed in terms of its angular position together with the readjustment device 11.

Since the connection of washer 118 and bearing wall 40a of the brake caliper 4 is integrated, by means of the calking process, into the assembly process of the disc brake 1, the readjustment device 11 can be set and fixed in accordance with the conditions (tolerances of the individual components). A simple and inexpensive assembly process is thus realized, with secure fixing of the readjustment device 10 together with the synchronization unit 10 by means of the most intense possible positive locking action. No further additional parts are necessary.

In the assembled state, the spindle axis 5a, the readjuster axis 11e and the support sleeve axis 116a run jointly through the bore central point 14a.

The exemplary embodiments described above do not restrict the invention, which may be modified within the scope of the appended claims.

It is accordingly possible, for example, for the disc brake 1 to have more than two spindle units 5, 5' or to have only one.

LIST OF REFERENCE DESIGNATIONS

1 Disc brake
2 Brake disc
2a Brake disc axis
3 Brake pad
3a Brake pad carrier
4 Brake caliper
4a Cover
4b Fixing section
4c Supporting surface
5, 5' Spindle unit
5a, 5'a Spindle axis
6, 6' Threaded plunger
6a, 6'a Thrust piece
7 Brake rotary lever
7a Lever arm
7b Bearing block
7c Tensioning section
7d Holding section
8 Drive
8a Actuator
8b Drive element
9 Wear-compensating readjustment apparatus
10 Synchronization unit
11 Readjustment device
11a Readjuster shaft
11b Readjuster output element
11c Shaft end
11d Bearing disc
11e Readjuster axis
12 Driver device
12a Driver shaft
12b Driver output element
12c Shaft end
12d Bearing disc
12e Driver axis
13 Synchronizer
13a, 13'a Synchronizing wheel
14, 14' Bore
14a, 14'a Bore central point
14b, 14'b Collar
14c, 14'c Collar edge
14d, 14'd Collar opening
14e Abutment surface
14f, 14'f Holding region
15, 15' Support disc
15a, 15'a Circular section edge
15b, 15'b Flattened portion
15c Fastening section
16, 16' Fastening recess
16a Fastening element
17 Crossmember
18 Head plate
18a Cylinder segment
18b Surface segment
18c Fixing section
18d Supporting surface
19 Direction of action
20 Fastening section
20a Disc section
40 Application section
40a Bearing wall
40b Counterpart surface
41 Bottom plate flange
42 Bottom plate
115 Closure cover
115a Fastening element
115b Fastening section
116 Support sleeve
116a Support sleeve axis
116b Support body
116c Flange
116d Radial toothing
116e Groove
116f Face surface
116g Projection
116h Profiling
116i Passage opening
116j-k Internal profile
118 Washer
118a Internal toothing
118b Fixing section
118c Opening
119 Securing element
A Application side
B Pad slot side The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for use with a brake disc in a motor vehicle, comprising:
a brake caliper which has an application section with an application apparatus;
at least one wear-compensating readjustment apparatus for compensating wear of brake pads; and
a synchronization unit which comprises a readjustment device, a driver device and a synchronizer, wherein
the readjustment device and the driver device are each inserted into a threaded plunger of a spindle unit and mounted by way of bearing arrangements on a bearing wall of the application section of the brake caliper,
the synchronization unit is installed, as a preassembled group together with the readjustment device and the driver device, into the application section of the brake caliper, and the synchronizer is arranged within the application section of the brake caliper in a region of the bearing arrangements on the bearing wall, wherein the bearing arrangement of the readjustment device comprises:
- a bore in the bearing wall of the application section of the brake caliper and a collar on the bearing wall within the application section of the brake caliper;
- a support disc on the readjustment device; and
- a bearing block with a holding section, the bearing arrangement of the driver device comprises:
- a bore in the bearing wall of the application section of the brake caliper and a collar on the bearing wall of the application section of the brake caliper;
- a support disc on the driver device; and
- the bearing block with a further holding section, each support disc has, in alternating fashion around its edge, two diametrically oppositely situated circular section edges and two diametrically oppositely situated flattened portions, the flattened portions of a respective support disc run in each case parallel to one another, each of the bores is surrounded, on an inner side of the bearing wall, by in each case one collar over an angle of approximately 240°, each collar is equipped with a respective collar edge and a respective collar opening, the collar openings are situated opposite one another, each collar edge of each collar has an internal radius which is smaller than an internal radius of the respectively associated bore, each collar is equipped with diametrically arranged holding regions in relation to a respective bore central point, in an installed state of the synchronization unit, the flattened portions of the support discs of the readjustment device and of the driver device are all arranged parallel to one another, said flattened portions run at right angles to an imaginary connecting line of bore central points of the bores, in the installed state of the synchronization unit, the bearing block is arranged between the readjuster device and the driver device, the bearing block bears with a longitudinal side against the inner side of the bearing wall, and in each case one lateral holding section on a narrow side of the bearing block is in positively locking contact with in each case one flattened portion of each support disc and forms a rotation prevention facility for the support discs.

2. The disc brake as claimed in claim 1, wherein the bearing block, with its longitudinal sides, forms guide sections for the synchronizer.

3. The disc brake as claimed in claim 1, wherein the bearing block forms a counterbearing for a brake rotary lever.

4. The disc brake as claimed in claim 1, wherein the bearing arrangement of the readjustment device and/or the bearing arrangement of the driver device have in each case one fastening element between the respective support disc and the application section of the brake caliper.

5. A method for installing a synchronization unit having a readjustment device and a driver device into a brake caliper of a disc brake, the method comprising the steps of:

(S1) assembling the synchronization unit having the readjustment device and the driver device, wherein a synchronizer with synchronizing wheels is arranged on upper ends of the readjustment device and of the driver device;

(S2) inserting the assembled synchronization unit into an interior space of an application section of the brake caliper through a brake-disc-side bottom plate flange; and (S3) mounting the readjustment device and the driver device of the inserted synchronization unit in a bearing wall of the application section of the brake caliper, wherein in method step (S1) of assembling, support discs are rotated about a respective axis such that flattened portions of the support discs run parallel to an imaginary connecting line of bore central points, and the readjuster device and the driver device are initially arranged adjacent to one another such that a spacing of a readjuster axis and a driver axis is smaller than a spacing of the bore central points.

6. The method as claimed in claim 5, wherein in method step (S2) of inserting, circular section edges, which point toward a respective bore, of the support discs are arranged laterally in front of a respective collar opening of collars of the bores.

7. The method as claimed in claim 6, wherein in method step (S3) of mounting, in a first partial step, the readjuster device and the driver device are slid apart in a direction of an imaginary connecting line of the bore central points to such an extent that the support discs are slid, with the circular section edges, which point toward the respective bore, first, over the respective bore between the respective collar and the bearing wall until said circular section edges come to bear against a respective wall arrangement between collar and the bearing wall, wherein the synchronizer is tensioned.

8. The method as claimed in claim 7, wherein in method step (S3) of mounting, in a second partial step, the support discs are each rotated through 90° about the readjuster axis and about the driver axis such that each circular section edge of the support discs is arranged between a respective holding region of the associated collar and the bearing wall of the application section of the brake caliper.

9. The method as claimed in claim 8, wherein in method step (S3) of mounting, in a third partial step, a bearing block is inserted through the bottom plate flange between the readjuster device and the driver device such that the bearing block bears with a longitudinal side against the bearing wall, tensions the synchronizer further and, with in each case one holding section, makes positively locking contact with a flattened portion of the support discs so as to form a rotation prevention facility for the support discs.

* * * * *